(12) United States Patent
Kumazaki et al.

(10) Patent No.: US 8,287,429 B2
(45) Date of Patent: Oct. 16, 2012

(54) SHIFTING CONTROL APPARATUS FOR VEHICULAR POWER TRANSMITTING SYSTEM

(75) Inventors: Kenta Kumazaki, Toyota (JP); Tooru Matsubara, Toyota (JP); Atsushi Tabata, Okazaki (JP); Tatsuya Imamura, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/322,524

(22) PCT Filed: May 26, 2009

(86) PCT No.: PCT/JP2009/059632
§ 371 (c)(1),
(2), (4) Date: Nov. 25, 2011

(87) PCT Pub. No.: WO2010/137123
PCT Pub. Date: Dec. 2, 2010

(65) Prior Publication Data
US 2012/0077638 A1 Mar. 29, 2012

(51) Int. Cl.
*H02P 17/00* (2006.01)
(52) U.S. Cl. ............................. 477/15; 477/5; 477/115
(58) Field of Classification Search .................. 477/3, 5, 477/7, 15, 115; 903/903, 944
See application file for complete search history.

(56) References Cited

U.S. PATENT DOCUMENTS 7,090,612 B2 * 8/2006 Ozeki et al. ..................... 477/3
2003/0045389 A1 3/2003 Kima
2009/0029825 A1 1/2009 Matsubara et al.

(Continued)

FOREIGN PATENT DOCUMENTS

JP 09-009414 1/1997

(Continued)

OTHER PUBLICATIONS

International Search Report issued Sep. 8, 2009 in PCT/JP2009/059632 filed May 26, 2009.

*Primary Examiner* — Justin Holmes
(74) *Attorney, Agent, or Firm* — Oblon, Spivak, McClelland, Maier & Neustadt, L.L.P.

(57) ABSTRACT

A shifting control apparatus for a power transmitting system of a vehicle provided with a vehicle drive electric motor, and a step-variable automatic transmission constituting a part of a power transmitting path between said vehicle drive electric motor and drive wheels, the shifting control apparatus controls said vehicle drive electric motor to perform a regenerative operation in a coasting state of the vehicle, and controls said automatic transmission to perform a shift-down operation at a predetermined coasting shift-down vehicle speed in the coasting state, the shifting control apparatus is configured: to change said coasting shift-down vehicle speed according to a regenerative power of said vehicle drive electric motor; to control said vehicle drive electric motor in the coasting state of the vehicle, so as to perform the regenerative operation at a vehicle speed higher than a predetermined drive/driven switching vehicle speed value, and so as to generate a vehicle drive torque at a vehicle speed lower than said predetermined drive/driven switching vehicle speed value; and to lower said coasting shift-down vehicle speed value at which the shift-down operation of said automatic transmission to a lowest shift position thereof is performed, and said drive/driven switching vehicle speed value, with an increase of said regenerative power of said vehicle drive electric motor.

8 Claims, 11 Drawing Sheets

U.S. PATENT DOCUMENTS

| | | | |
|---|---|---|---|
| 2009/0048050 A1* | 2/2009 | Kamada et al. | 475/150 |
| 2009/0088290 A1 | 4/2009 | Tabata et al. | |

FOREIGN PATENT DOCUMENTS

| | | |
|---|---|---|
| JP | 2001-173768 | 6/2001 |
| JP | 2003-072403 | 3/2003 |
| JP | 2004-194456 | 7/2004 |
| JP | 2004-204958 | 7/2004 |
| JP | 2006-335127 | 12/2006 |
| JP | 2008-094253 | 4/2008 |
| JP | 2008-290582 | 12/2008 |
| JP | 2009-023614 | 2/2009 |

* cited by examiner

|  | C1 | C2 | C3 | B1 | B2 | F1 | SPEED RATIO | STEPPING RATIO |
|---|---|---|---|---|---|---|---|---|
| 1st | O |  |  |  | (O) | O | 3.20 | 1.86 |
| 2nd | O |  |  | O |  |  | 1.72 | 1.72 |
| 3rd | O | O |  |  |  |  | 1.00 | 1.49 |
| 4th |  | O |  | O |  |  | 0.67 | SPREAD 4.76 |
| Rev |  |  | O |  | O |  | 2.04 |  |
| N |  |  |  |  |  |  |  |  |

SHIFTING CONTROL APPARATUS FOR VEHICULAR POWER TRANSMITTING SYSTEM

TECHNICAL FIELD

The present invention relates to techniques for improving the fuel economy of a vehicle having an automatic transmission.

BACKGROUND ART

There is well known a vehicular power transmitting system provided with an electric differential portion having a differential mechanism a differential state of which is controlled by controlling an operating state of a differential electric motor connected to the differential mechanism, a vehicle drive electric motor operatively connected to a power transmitting path between the electric differential portion and drive wheels, and a transmission portion constituting a part of the power transmitting path. Patent Document 1 discloses an example of such a vehicular power transmitting system. This power transmitting system is provided with a an electric differential portion having a planetary gear set, a first electric motor (differential electric motor) connected to a sun gear of the planetary gear set, and a second electric motor (vehicle drive electric motor) connected to a ring gear of the planetary gear set, and a step-variable automatic transmission portion which is connected to an output side (ring gear) of the electric differential portion and which is shifted by simultaneous engaging and releasing actions of coupling devices. The power transmitting system is configured such that a differential state between a speed of an input rotary motion transmitted from an engine through a carrier of the planetary gear set and a speed of an output rotary motion of an output member in the form of the ring gear is controlled by controlling the operating state of the first electric motor. A shifting control apparatus for this vehicular power transmitting system has reference vehicle speeds stored in a memory, at which a drive force of the vehicle in a coasting state (during costing of the vehicle with an accelerator pedal held in an off state) is substantially zero, that is, at which a deceleration value of the vehicle is substantially zero, so that coasting shift-down operations of the step-variable automatic transmission portion are performed when an actual value of the vehicle speed becomes equal to the respective reference vehicle speeds. This manner of coasting shift-down operations prevents interruption of deceleration of the vehicle.

PRIOR ART DOCUMENTS

Patent Documents

Patent Document 1: JP-2008-290582 A
Patent Document 2: JP-9-9414 A

SUMMARY OF THE INVENTION

Object to be Achieved by the Invention

By the way, it is well known that the vehicle having the power transmitting system with the electric motor connected to the power transmitting path as disclosed in Patent Document 1 is configured to control the electric motor to perform a regenerative operation for converting a reverse vehicle drive force transmitted from the drive wheels into an electric energy in the coasting state of the vehicle. In the vehicular power transmitting system of Patent Document 1, for instance, the above-described vehicle drive electric motor performs the regenerative operation in the coasting state of the vehicle. This regenerative operation of the vehicle drive electric motor improves the fuel economy of the vehicle as a whole. The degree of improvement of the fuel economy increases with an increase of the amount of regeneration of the electric energy.

However, the above-described reference vehicle speeds are not determined for the purpose of performing the regenerative operation of the above-described vehicle drive electric motor so as to reduce a power loss of the vehicle as a whole, and the shifting control apparatus for the vehicular power transmitting system of Patent Document 1 is not necessarily configured to perform the shift-down operations of the step-variable automatic transmission portion so as to improve the fuel economy in the coasting state of the vehicle. It is noted that this problem is not known in the art.

The present invention was made in view of the background art described above. It is an object of this invention to provide a shifting control apparatus for a vehicular power transmitting system the electric motor of which performs a regenerative operation in the vehicle coasting state, which shifting control apparatus controls the automatic transmission to perform a shift-down operation in the vehicle coasting state so as to improve the fuel economy.

Means for Achieving the Object

The object indicated above can be achieved according to the first aspect of the present invention, which provides a shifting control apparatus for (a) a power transmitting system of a vehicle provided with a vehicle drive electric motor, and a step-variable automatic transmission constituting a part of a power transmitting path between the vehicle drive electric motor and drive wheels, the above-described vehicle drive electric motor being controlled to perform a regenerative operation in a coasting state of the vehicle, the shifting control apparatus controlling the above-described automatic transmission to perform a shift-down operation at a predetermined coasting shift-down vehicle speed value in the coasting state of the vehicle, (b) the shifting control apparatus being characterized by controlling change the above-described coasting shift-down vehicle speed value according to a regenerative power of the above-described vehicle drive electric motor.

According to the second aspect of the present invention, the shifting control apparatus is characterized by (a) controlling the above-described vehicle drive electric motor in the coasting state of the vehicle, so as to perform the regenerative operation at a vehicle speed higher than a predetermined drive/driven switching vehicle speed value, and so as to generate a vehicle drive torque at a vehicle speed lower than the drive/driven switching vehicle speed value, and (b) lowering the above-described coasting shift-down vehicle speed value at which the shift-down operation of the above-described automatic transmission to a lowest shift position thereof is performed, and the above-described drive/driven switching vehicle speed value, with an increase of the above-described regenerative power of the above-described vehicle drive electric motor.

According to the third aspect of the present invention, the shifting control apparatus is characterized by controlling the above-described automatic transmission to perform the shift-down operation to the above-described lowest shift position in the coasting state of the vehicle, by engaging one of coupling elements of the automatic transmission selected to be engaged, after a rotating speed of an input speed of the above-descried automatic transmission is controlled by the above-descried vehicle drive electric motor to a synchronous speed value to be established after the above-described shift-down operation, while the coupling element selected to be released and the above-described coupling element selected to be engaged are placed in released states thereof.

According to the fourth aspect of the present invention, the shifting control apparatus is characterized by performing the above-described shift-down operation in the coasting state of the vehicle under a condition that a regenerative torque generated during the regenerative operation of the above-described vehicle drive motor to be performed after the shift-down operation is equal to or larger than a predetermined torque value.

The fifth aspect of the present invention is characterized by the provision of an electric differential portion having a differential mechanism connected between an engine and the above-described automatic transmission, and a differential electric motor being operatively connected to the differential mechanism and a differential state of the differential mechanism is controlled by controlling an operating state of the differential electric motor m.

The sixth aspect of the present invention is characterized in that (a) the above-described differential mechanism is a planetary gear set having a first rotary element, a second rotary element and a third rotary element, and (b) the above-described first rotary element is connected to the above-described engine, and the above-described second rotary element is connected to the above-described differential electric motor, while the above-described third rotary element is connected to the above-described vehicle drive electric motor and an input rotary member of the above-described automatic transmission.

The seventh aspect of the present invention is characterized in that (a) an electric-energy storage device to be charged with the above-described regenerative power of the above-described vehicle drive electric motor is provided, and (b) the above-described vehicle drive electric motor, the above-described differential electric motor and the above-described electric-energy storage device being capable of supplying and receiving an electric power to and from each other.

The eighth aspect of the present invention is characterized in that the above-described automatic transmission has a plurality of shift positions which are mechanically established and which have respective different speed ratios, and is shifted from one of the shift positions to another.

The ninth aspect of the present invention is characterized in that the above-described automatic transmission has coupling elements and is shifted by simultaneous releasing and engaging actions of one and another of the coupling elements.

Advantages of the Invention

The shift control apparatus according to the first aspect of the present invention is configured to (a) implement the regenerative control to control the above-described vehicle drive electric motor to perform the regenerative operation in the coasting state of the vehicle, and control the above-described automatic transmission to perform the shift-down operation at the above-described coasting shift-down vehicle speed value in the coasting state of the vehicle, and (b) change the above-described coasting shift-down vehicle speed value according to the regenerative power of the vehicle drive electric motor in the coasting state of the vehicle. Thus, the coasting shift-down vehicle speed value can be set according to a parameter in the form of the regenerative power of the vehicle drive electric motor, so as to maximize an amount of regeneration of an electric energy, so that the coasting shift-down operation of the automatic transmission can be performed at the thus set vehicle speed value so as to improve the fuel economy, as compared with a coasting shift-down operation performed at the fixed vehicle speed value. Where the above-described automatic transmission is a multi-step transmission having three or more shift positions, the coasting shift-down vehicle speed value is set for each of coasting shift-down operations of the multi-step transmission in the coasting state of the vehicle.

Preferably, the above-described shift control apparatus is configured to change the above-described coasting shift-down vehicle speed value according to the regenerative power of the above-described vehicle drive electric motor, in a direction for reducing an energy loss of the vehicle as a while (a total loss) in the coasting state of the vehicle.

According to the second aspect of the present invention, the shifting control apparatus is configured to (a) to control the above-described vehicle drive electric motor in the coasting state of the vehicle, so as to perform the regenerative operation at a vehicle speed higher than a predetermined drive/driven switching vehicle speed value, and so as to generate a vehicle drive torque at a vehicle speed lower than the drive/driven switching vehicle speed value, and (b) to lower the above-described coasting shift-down vehicle speed value at which the shift-down operation of the above-described automatic transmission to a lowest shift position thereof is performed, and the above-described drive/driven switching vehicle speed value, with an increase of the above-described regenerative power of the above-described vehicle drive electric motor. Accordingly, the vehicle can be run at a considerably low speed not higher than the above-described drive/driven switching vehicle speed value, with the above-described vehicle drive torque (creep torque), and the above-described vehicle drive electric motor can perform the regenerative operation at the vehicle speed within a range the lower limit of which is as low as the drive/driven switching vehicle speed which is lowered according to the above-described regenerative power, so that the shift-down operation to the above-described lowest shift position can be performed in the vehicle coasting state, so as to improve the fuel economy.

Preferably, the above-described coasting shift-down vehicle speed value at which the shift-down operation of the above-described automatic transmission to the lowest shift position is performed is set to be equal or almost equal to the above-described drive/driven switching value speed value.

According to the third aspect of the present invention, the shifting control apparatus is configured to control the above-described automatic transmission to perform the shift-down operation to the above-described lowest shift position in the coasting state of the vehicle, by engaging one of coupling elements of the automatic transmission selected to be engaged, after a rotating speed of an input speed of the above-descried automatic transmission is controlled by the above-descried vehicle drive electric motor to a synchronous speed value to be established after the above-described shift-down operation, while the coupling element selected to be released and the above-described coupling element selected to be engaged are placed in released states thereof. Accordingly, the shifting shock upon this coasting shift-down operation can be reduced to improve the drivability of the vehicle. In addition, the determination of the above-described coasting shift-down vehicle speed value and the above-described drive/driven switching vehicle speed value according to the second aspect of the present invention described above makes it possible to prevent the interruption of deceleration of the vehicle which would otherwise take place during the shift-down operation to the above-described lowest shift position performed in the coasting state of the vehicle Preferably, the shift positions of the above-described automatic transmission have respective speed ratios which are determined such that a difference between the gear ratios (stepping gear ratio) of the adjacent two shift positions increases as the speed ratios of the adjacent two shift positions increase.

Generally, an electric motor has a characteristic that its loss is smaller in its low-torque high-speed operation than in its high-torque low-speed operation. In this respect, the amount of reduction of the loss of the above-described vehicle drive electric motor by the shift-down operation that causes a rise of the operating speed of the vehicle drive electric motor is small when the shift-down operation is performed while the torque of the vehicle drive electric motor is relatively small. However, the shifting control apparatus according to the fourth aspect of the present invention is configured such that the above-described shift-down operation is performed in the coasting state of the vehicle under a condition that a regenerative torque generated during the regenerative operation of the above-described vehicle drive motor to be performed after the shift-down operation is equal to or larger than a predetermined torque value. Thus even when mechanical loss increases due to the shift-down operation thereafter, improvement of loss due to the regenerative operation of the above-described vehicle drive motor exceeds the mechanical loss. Therefore a regenerative efficiency as a whole of vehicle is improved and a fuel economy is improved.

Preferably, the above-described shifting control apparatus controls the above-described vehicle drive electric motor to perform the regenerative operation after said shift-down operation in the coasting state of the vehicle such that the regenerative power of the vehicle drive electric motor after the shift-down operation is equal to that before the shift-down operation, in other words, approaches the regenerative power before the shift-down operation.

According to the fifth aspect of the present invention, the above-described power transmitting system of the vehicle is provided with an electric differential portion having a differential mechanism connected between an engine and the above-described automatic transmission, and a differential electric motor being operatively connected to the differential mechanism and a differential state of the differential mechanism is controlled by controlling an operating state of the differential electric motor. Accordingly, although the above-described automatic transmission is a step-variable transmission a speed ratio of which is variable in steps, the power transmitting system of the vehicle as a whole is operable as a continuously-variable transmission, in which the speed ratio is variable continuously, when the differential state of the above-described differential mechanism is controlled.

According to the sixth aspect of the present invention, (a) the above-described differential mechanism is a planetary gear set having a first rotary element, a second rotary element and a third rotary element, and (b) the above-described first rotary element is connected to the above-described engine, and the above-described second rotary element is connected to the above-described differential electric motor, while the above-described third rotary element is connected to the above-described vehicle drive electric motor and an input rotary member of the above-described automatic transmission. Accordingly, one or both of the above-described engine and vehicle drive electric motor can be used as the vehicle drive power source.

According to the seventh aspect of the present invention, an electric-energy storage device to be charged with the above-described regenerative power of the above-described vehicle drive electric motor, and the above-described vehicle drive electric motor, the above-described differential electric motor and the above-described electric-energy storage device being capable of supplying and receiving an electric power to and from each other, so that the above-described regenerative power can be temporarily stored for subsequent use as needed. Further, the above-described vehicle drive electric motor and differential electric motor are capable of electric power transmission to each other.

According to the eighth aspect of the present invention, the above-described automatic transmission has a plurality of shift positions which are mechanically established and which have respective different speed ratios, and is shifted from one of the shift positions to another, so that the automatic transmission can be made compact in construction and has a relatively wide overall spread of the speed ratios.

According to the ninth aspect of the present invention, the above-descried automatic transmission has coupling elements and is shifted by simultaneous releasing and engaging actions of one and another of the coupling elements. Namely, the present invention is applicable to a vehicle having an automatic transmission which is arranged to perform clutch-to-clutch shifting operations.

MODE FOR CARRYING OUT THE INVENTION

An embodiment of the present invention will be described in detail by reference to the drawings.

Embodiment 1

Figure 1:
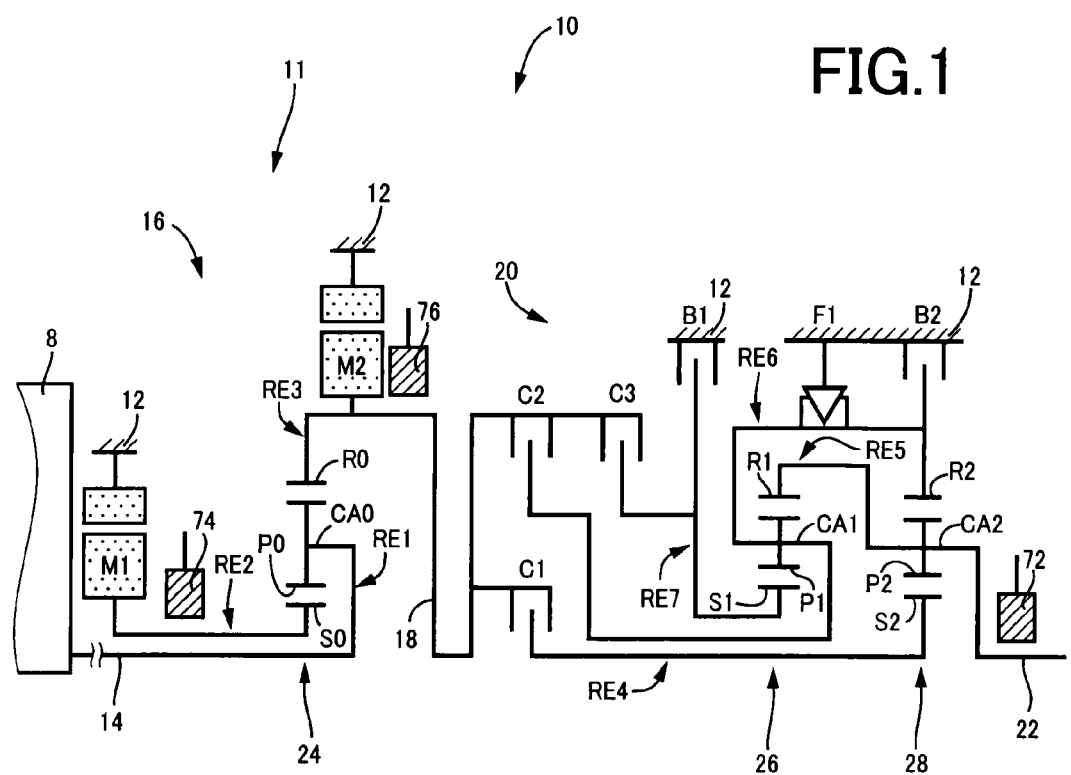
FIG. 1 is a schematic view for explaining an arrangement of a vehicular power transmitting system to which a shifting control apparatus according to the present invention is applicable.
Figure 5:
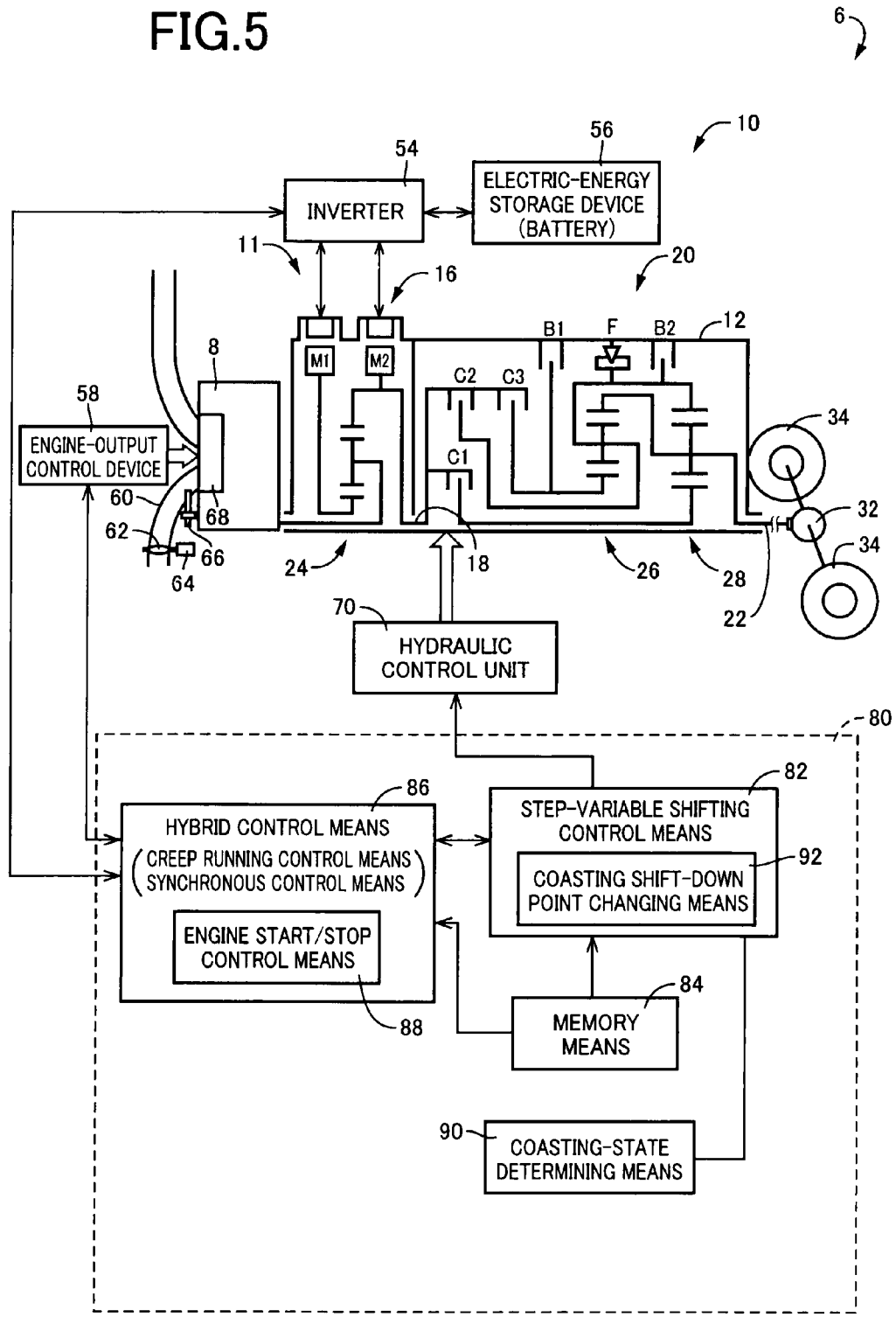
FIG. 5 is a functional block diagram illustrating major control functions of the electronic control device of FIG. 4.

FIG. 1 is the schematic view showing a vehicular power transmitting system 10 (hereinafter referred to as "power transmitting system 10") to which a shifting control apparatus according to the present invention is applicable. This power transmitting system 10 is suitably used for a hybrid vehicle. As shown in FIG. 1, the power transmitting system 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of an automatic transmission portion 20 disposed in a power transmitting path between the differential portion 11 and drive wheels 34 (shown in FIG. 5) and connected in series via a power transmitting member 18 to the differential portion 11 and the drive wheels 34; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as "casing 12") functioning as a stationary member attached to a body of the vehicle, and are connected in series with each other. This power transmitting system 10 is suitably used for a longitudinal FR vehicle 6 (front-engine, rear-drive vehicle), for example (as shown in FIG. 5), and is disposed between a vehicle drive power source in the form of an internal combustion engine 8 and the pair of drive wheels 34, to transmit a drive power force from the engine 8 to the pair of drive wheels 34 through a differential gear device (final speed reduction gear) 32 (shown in FIG. 5) constituting a part of the power transmitting path and a pair of drive axles. The engine 8 may be a gasoline engine or diesel engine, for example, and functions as a vehicle drive power source connected to the input shaft 14 directly, or via the pulsation absorbing damper not shown.

In the present power transmitting system 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the power transmitting system 10, which is constructed symmetrically with respect to its axis, is omitted in the schematic view of FIG. 1.

The differential portion 11, which functions as an electrically controlled differential portion, includes: a power distributing mechanism 16; a first electric motor M1 operatively connected to the power distributing mechanism 16 and functioning as a differential electric motor for controlling a differential state of the power distributing mechanism 16; and a second electric motor M2 operatively connected to and rotated with the power transmitting member 18. The power transmitting member 18, which is an output-side rotary member of the differential portion 11, is also equivalent to an input-side rotary member of the automatic transmission portion 20.

Each of the first and second electric motors M1 and M2 is a so-called motor/generator having a function of a motor operable to convert an electric energy into a mechanical drive force, and a function of an electric generator operable to convert a mechanical drive force into an electric energy. In other words, in the power transmitting system 10, the electric motors M can operate in place of a main drive power source in the form of the engine 8, or can function as a drive power source (auxiliary drive power source) operable together with the engine 8 to generate a vehicle drive power source. Each of the electric motors M also operate to regenerate an electric energy from a drive force generated by other drive power sources, so that the regenerated electric energy is supplied to the other electric motor M through an inverter 54 (shown in FIG. 5), or used to charge an electric-energy storage device 56 (shown in FIG. 5).

The first electric motor M1 has at least the function of the generator (electric generator) operable to generate a reaction force, while the second electric motor M2 is operatively connected to the drive wheels 34, and has at least the function of the motor (electric motor) functioning as a drive electric motor serving as a second vehicle drive power source operable to generate a vehicle drive force. Preferably, each of the first electric motor M1 and the second electric motor M2 is configured such that an amount of electric energy which the motor M operating as the electric motor can generate is continuously variable. The first electric motor M1 and the second electric motor M2 are disposed within the casing 12 serving as the housing of the power transmitting system 10, and are cooled by a working oil of the automatic transmission portion 20, which is a working fluid of the power transmitting system 10.

The power distributing mechanism 16 is a differential mechanism connected between the engine 8 and the automatic transmission portion 20, and is principally constituted by a differential-portion planetary gear set 24 of a single pinion type having a gear ratio ρ0 of about 0.416, for example. The power distributing mechanism 16 is a mechanism configured to mechanically distribute an output of the engine 8 received through the input shaft 14. The differential-portion planetary gear set 24 has rotary elements (elements) consisting of: a differential-portion sun gear S0, a differential-portion planetary gear P0; a differential-portion carrier CA0 supporting the differential-portion planetary gear P0 such that the differential-portion planetary gear P0 is rotatable about its axis and about the axis of the differential-portion sun gear S0; and a differential-portion ring gear R0 meshing with the differential-portion sun gear S0 through the differential-portion planetary gear P0. Where the numbers of teeth of the differential-portion sun gear S0 and the differential-portion ring gear R0 are represented by ZS0 and ZR0, respectively, the above-indicated gear ratio ρ0 is represented by ZS0/ZR0.

In the power distributing mechanism 16, the differential-portion carrier CA0 is connected to the input shaft 14, that is, to the engine 8, and the differential-portion sun gear S0 is connected to the first electric motor M1, while the differential-portion ring gear R0 is connected to the power transmitting member 18. The power distributing mechanism 16 constructed as described above is placed in a differentially operable state (differential state) in which three elements of the planetary gear set 24 consisting of the differential-portion sun gear S0, differential-portion carrier CA0 and differential-portion ring gear R0 are rotatable relative to each other and differential operation is affective. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the operating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously variable from a minimum value γ0min to a maximum value γ0max and in which the differential portion 11 serves as an electrically controlled continuous variable transmission. In the differential state of the power distributing mechanism 16, the differential state of the power distributing mechanism 16, that is, a differential state between the rotating speed of the input shaft 14 and the rotating speed of the power transmitting member 18 is controlled by controlling one or both of the operating states of the first and second electric motors M1 and M2 that are operatively connected to the power distributing mechanism 16 (differential portion 11). As is apparent from FIG. 1, the rotating speed $N_{IN}$ of the input shaft 14 (hereinafter referred to as "input shaft rotating speed $N_{IN}$") is equal to the engine speed $N_E$, in the present embodiment.

The automatic transmission portion 20 corresponding to an automatic transmission according to the present invention is provided with a single-pinion type first planetary gear set 26 and a single-pinion type planetary gear set 28, and constitutes a part of a power transmitting path between the engine 8 and the drive wheels 34. The automatic transmission portion 20 is a planetary gear type multi-step transmission functioning as a step-variable automatic transmission having a plurality of speed ratios $γ_{AT}$ that are mechanically established in steps. In other words, the automatic transmission portion 20 is shifted from one of a plurality of mechanically established shift positions (1$^{st}$ through 4$^{th}$ positions) having respective different speed ratios $γ_{AT}$, to another of the shift positions. As shown in FIG. 1, the second electric motor M2 is connected to the power transmitting member 18, so that the automatic transmission portion 20 is considered as a transmission to constitute a portion of a power transmitting path between the second electric motor M2 and the drive wheels 34. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a predetermined gear ratio ρ1 of about 0.488. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a predetermined gear ratio ρ2 of about 0.455. Where the numbers of teeth of the first sun gear S1, first ring gear R1, second sun gear S2 and second ring gear R2 are represented by ZS1, ZR1, ZS2 and ZR2, respectively, the above-indicated gear ratios ρ1 and ρ2 are represented by ZS1/ZR1 and ZS2/ZR2, respectively.

In the automatic transmission portion 20, the first sun gear S1 is connected to the power transmitting member 18 through a third clutch C3, and selectively fixed to the casing 12 through a first brake B1, and the first carrier CA1 and the second ring gear R2 are integrally fixed to each other, connected to the power transmitting member 18 through the second clutch C2 and further selectively fixed to the casing 12 through a second brake B2. The first ring gear R1 and the second carrier CA2 are integrally fixed to each other and to the output shaft 22, and the second sung gear S2 is selectively connected to the power transmitting member 18 through a first clutch C1. The first carrier CA1 and the second ring gear R2 are connected to the stationary member in the form of the casing 12 through a one-way clutch F1, so that the first carrier CA1 and second ring gear R2 are permitted to rotate in the direction of operation of the engine 8, but are inhibited from rotating in the direction opposite to the direction of operation of the engine 8. Thus, the first carrier CA1 and the second ring gear R2 serve as rotary members which is impossible to rotate in reverse direction.

Figures 2, 3:
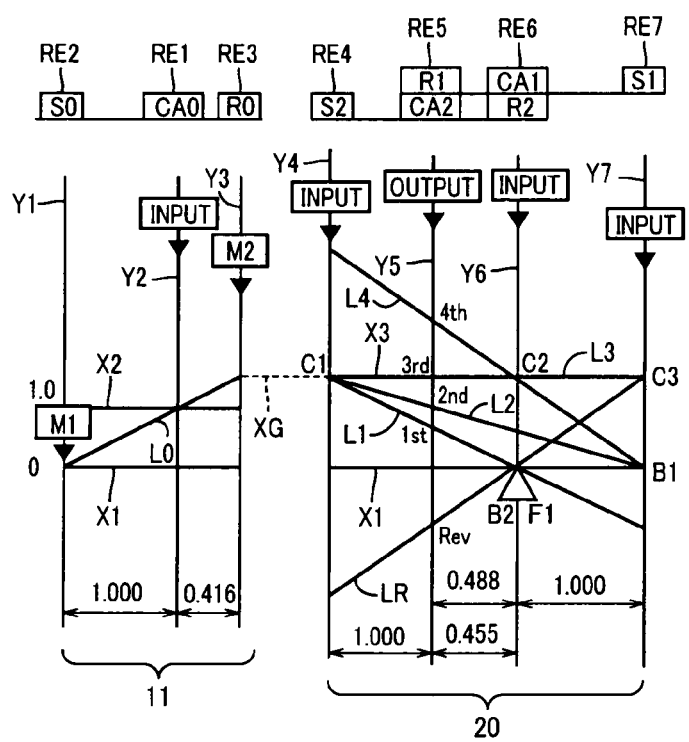
FIG. 2 is a table indicating shifting actions of an automatic transmission portion provided in the power transmitting system of a vehicle shown in FIG. 1, in relation to different combinations of operating states of hydraulically operated frictional coupling devices provided to effect the respective shifting actions.
FIG. 3 is a collinear chart indicating relative rotating speeds in different gear positions of the vehicular power transmitting system of FIG. 1.

The automatic transmission portion 20 constructed as described above performs a shifting operation by a releasing action of a coupling device selected to be released (a coupling element selected to be released) and an engaging action of another coupling device selected to be engaged (a coupling element selected to be engaged). Namely, the automatic transmission portion 20 performs a clutch-to-clutch shifting operation involving simultaneous releasing and engaging actions of two coupling elements, to establish a selected one of its plurality of gear positions (shift positions). The gear positions have respective speed ratios $γ_{AT}$ (rotating speed $N_{18}$ of the power transmitting member 18/rotating speed $N_{OUT}$ of the output shaft 22) which change as geometric series. Since the speed rations $γ_{AT}$ change as geometric series, differences between the speed rations $γ_{AT}$ of the adjacent shift positions (stepping gear ratios) increase in the direction toward the lower-speed shift positions. As indicated in the table of FIG. 2, the first gear position having the speed ratio of about 3.20, for example, is established by an engaging actions of the first clutch C1 and one-way clutch F1, and the second gear position having the speed ratio of about 1.72, for example, is established by engaging actions of the first clutch C1 and first brake B1. The third gear position having the speed ratio of about 1.00, for example, is established by engaging actions of the first and second clutches C1 and C2 and the fourth gear position having the speed ratio of about 0.67, for example, is established by engaging actions of the second clutch C2 and first brake B1. The reverse gear position having the speed ratio of about 2.04, for example, is established by engaging actions of the third clutch C3 and the second brake B2, and the neutral position N is established when the first clutch C1, second clutch C2, third clutch C3, first brake B1 and second brake B2 are placed in the released state. An engine brake is applied to the vehicle in the first gear position when the second brake B2 is also engaged.

Thus, the power transmitting path through the automatic transmission portion 20 is switched between a power transmitting state for transmitting the vehicle drive force, and a power disconnecting path for inhibiting the transmission of the vehicle drive force, by appropriate combinations of the engaged and released states of the first clutch C1, second clutch C2, third clutch C3, first brake B1 and second brake B2. Namely, the above-indicated power transmitting path is placed in the power transmitting state when one of the first through four gear positions and the reverse gear position is established, and in the power disconnecting state when none of the gear positions are established, for example, when the neutral position N is established.

The above-described first clutch C1, second clutch C2, third clutch C2, first brake B1 and second brake B2 (hereinafter collectively referred to as clutches C and brakes B, unless otherwise specified), which are provided in the automatic transmission portion 20, are hydraulically operated frictional coupling devices used as coupling elements in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1-C3 and brakes B1, B2 is selectively engaged for connecting two members between which each clutch or brake is interposed.

In the power transmitting system 10 constructed as described above, the differential portion 11 functioning as the continuously-variable transmission and the automatic transmission portion 20 cooperate with each other to constitute a continuously-variable transmission. While the differential portion 11 is controlled to hold its speed ratio constant, the differential portion 11 and the automatic transmission portion 20 cooperate to function as a device equivalent to a step-variable transmission.

Described in detail, When the differential portion 11 functions as the continuously-variable transmission while the automatic transmission portion 20 connected in series to the differential portion 11 functions as the step-variable transmission, a speed $N_{ATIN}$ of the rotary motion transmitted to the automatic transmission portion 20 placed in at least a selected one of the shift positions M (hereinafter referred to as "AT input speed $N_{ATIN}$"), namely, the rotating speed of the power transmitting member 18 (hereinafter referred to as "transmitting-member speed $N_{18}$") is continuously changed, so that the speed ratio when the automatic transmission portion 20 is placed in the selected shift position M is continuously variable over a predetermined range. Accordingly, an overall speed ratio γT of the power transmitting system 10 (rotating speed $N_{IN}$ of the input shaft 14/rotating speed $N_{OUT}$ of the output shaft 22) is continuously variable. Thus, the power transmitting system 10 as a whole is operable as a continuously-variable transmission. This overall speed ratio γT of the power transmitting system 10 is determined by the speed ratio γ0 of the differential portion 11 and the speed ratio $γ_{AT}$ of the automatic transmission portion 20. For example, the transmitting-member speed $N_{18}$ is continuously variable over the predetermined range when the automatic transmission portion 20 is placed in a selected one of the first through fourth gear positions and reverse gear position as indicated in the table of FIG. 2. Accordingly, the overall speed ratio γT of the power transmitting system 10 is continuously variable across the adjacent gear positions.

When the speed ratio of the differential portion 11 is held constant while the clutches C and brakes B are selectively engaged to establish the selected one of the first through fourth gear positions and the reverse gear position (reverse drive position), the overall speed ratio γT of the power transmitting system 10 is variable in steps as geometric series. Thus, the power transmitting system 10 is operable as a system equivalent to a step-variable transmission.

The collinear chart of FIG. 3 indicates, by straight lines, a relationship among the rotating speeds of the rotary elements in each of the gear positions of the power transmitting system 10, which is constituted by the differential portion 11 functioning as the continuously-variable transmission portion or a first transmission portion, and the automatic transmission portion 20 functioning as the step-variable transmission portion or a second transmission portion. The different gear positions correspond to respective different states of connection of the rotary elements. The collinear chart of FIG. 3 is a rectangular two-dimensional coordinate system in which the gear ratios ρ of the planetary gear sets 24, 26 and 28 are taken along the horizontal axis, while the relative rotating speeds of the rotary elements are taken along the vertical axis. One of three horizontal lines, that is, a horizontal line X1 indicates the rotating speed of 0, while the horizontal line X2 located above the horizontal line X1 indicates the rotating speed of 1.0, that is, an operating speed $N_E$ of the engine 8 connected to the input shaft 14 (hereinafter referred to as "engine speed $N_E$"). The horizontal line XG (X3) indicates the rotating speed $N_{18}$ of the power transmitting member 18, that is, the rotating speed of a third rotary element RE3 described below, a rotary motion of which is transmitted from the differential portion 11 to the automatic transmission portion 20.

Three vertical lines Y1, Y2 and Y3 corresponding to the respective three elements of the power distributing mechanism 16 of the differential portion 11 respectively represent the relative rotating speeds of a second rotary element (second element) RE2 in the form of the differential-portion sun gear S0, a first rotary element (first element) RE1 in the form of the differential-portion carrier CA0, and the third rotary element (third element) RE3 in the form of the differential-portion ring gear R0. The distances between the adjacent ones of the vertical lines Y1, Y2 and Y3 are determined by the gear ratio ρ0 of the differential-portion planetary gear set 24. Further, four vertical lines Y4, Y5, Y6 and Y7 corresponding to the automatic transmission portion 20 respectively represent the relative rotating speeds of a fourth rotary element (fourth element) RE4 in the form of the second sun gear S2, a fifth rotary element (fifth element) RE5 in the form of the first ring gear R1 and second carrier CA2 fixed to each other, a sixth rotary element (sixth element) RE6 in the form of the first carrier CA1 and second ring gear R2 fixed to each other, and a seventh rotary element (seventh element) RE7 in the form of the first sun gear S1. The distances between the adjacent ones of the vertical lines are determined by the gear ratios ρ1 and ρ2 of the first and second planetary gear sets 26 and 28 respectively. In the relationship among the vertical lines of the collinear chart, the distances between the sun gear and carrier of each planetary gear set correspond to "1", while the distances between the carrier and ring gear of each planetary gear set correspond to the gear ratio ρ. In the differential portion 11, the distance between the vertical lines Y1 and Y2 corresponds to "1", while the distance between the vertical lines Y2 and Y3 corresponds to the gear ratio ρ0. In the automatic transmission portion 20, the distance between the sun gear and carrier of each of the first and second planetary gear sets 26 and 28 corresponds to "1", while the distance between the carrier and ring gear of each planetary gear set 26, 28 corresponds to the gear ratio ρ.

Referring to the above-indicated collinear chart of FIG. 3, the power distributing mechanism 16 (differential portion 11) of the power transmitting system 10 is arranged such that the first rotary element RE1 (differential-portion carrier CA0) of the differential-portion planetary gear set 24 is fixed to the input shaft 14, that is, to the engine 8, and the second rotary element RE2 is fixed to the first electric motor M1, while the third rotary element RE3 (differential-portion ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the differential-portion sun gear S0 and the differential-portion ring gear R0 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the differential-portion carrier CA0, that is, the engine operating speed $N_E$, which is represented by a point of intersection between the straight line L0 and the vertical line Y2, is raised or lowered by controlling the operating speed of the first electric motor M1 such that the rotating speed of the differential-portion sun gear S0 represented by a point of intersection between the straight line L0 and the vertical line Y1 is raised or lowered, if the rotating speed of the differential-portion ring gear R0 represented by a point of intersection between the straight line L0 and the vertical line Y3 is substantially held constant at a value determined by the vehicle running speed V. When the rotating speed of the first electric motor M1 is controlled such that the speed ratio γ0 of the differential portion 11 is held at 1, so that the rotating speed of the differential-portion sun gear S0 is made equal to the engine speed $N_E$, the straight line L0 is aligned with the horizontal line X2, so that the differential-portion ring gear R0, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the differential-portion sun gear S0 is zeroed, the straight line L0 is inclined as indicated in FIG. 3, so that the power transmitting member 18 is rotated at a speed $N_{18}$ higher than the engine speed $N_E$.

In the automatic transmission portion 20, the fourth rotary element RE4 is selectively connected to the power transmitting member 18 through the first clutch C1, and the fifth rotary element RE5 is connected to the output shaft 22, while the sixth rotary element RE6 is selectively connected to the power transmitting member 18 through the second clutch C2 and selectively fixed to the transmission casing 12 through the second brake B2. The seventh rotary element RE7 is selectively connected to the power transmitting member 18 through the third clutch C3 and selectively fixed to the casing 12 through the first brake B1.

The automatic transmission portion 20 is placed in the first gear position when the first clutch C1 and the second brake B2 are engaged. The rotating speed of the output shaft 22 in the first gear position is represented by a point of intersection between a straight oblique line L1 passing a point of intersection between the vertical line Y4 indicative of the rotating speed of the fourth rotary element RE4 and the horizontal line X3 and a point of intersection between the vertical line Y6 indicative of the rotating speed of the sixth rotary element RE6 and the horizontal line X1, and the vertical line Y5 indicative of the rotating speed of the fifth rotary element fixed to the output shaft 22, as indicated in FIG. 3. Similarly, the rotating speed of the output shaft 22 in the second gear position established by the engaging actions of the first clutch C1 and first brake B1 is represented by a point of intersection between an oblique straight line L2 determined by those engaging actions, and the vertical line Y5 indicative of the rotating speed of the fifth rotary element RE5 fixed to the output shaft 22. The rotating speed of the output shaft 22 in the third gear position established by the engaging actions of the first clutch C1 and second clutch C2 is represented by a point of intersection between a horizontal straight line L3 determined by those engaging actions and the vertical line Y5 indicative of the rotating speed of the fifth rotary element RE5 fixed to the output shaft 22. The rotating speed of the output shaft 22 in the fourth gear position established by the engaging actions of the second clutch C2 and first brake B1 is represented by a point of intersection between an oblique straight line L4 determined by those engaging actions and the vertical line Y5 indicative of the rotating speed of the fifth rotary element RE5 fixed to the output shaft 22.

Figure 4:
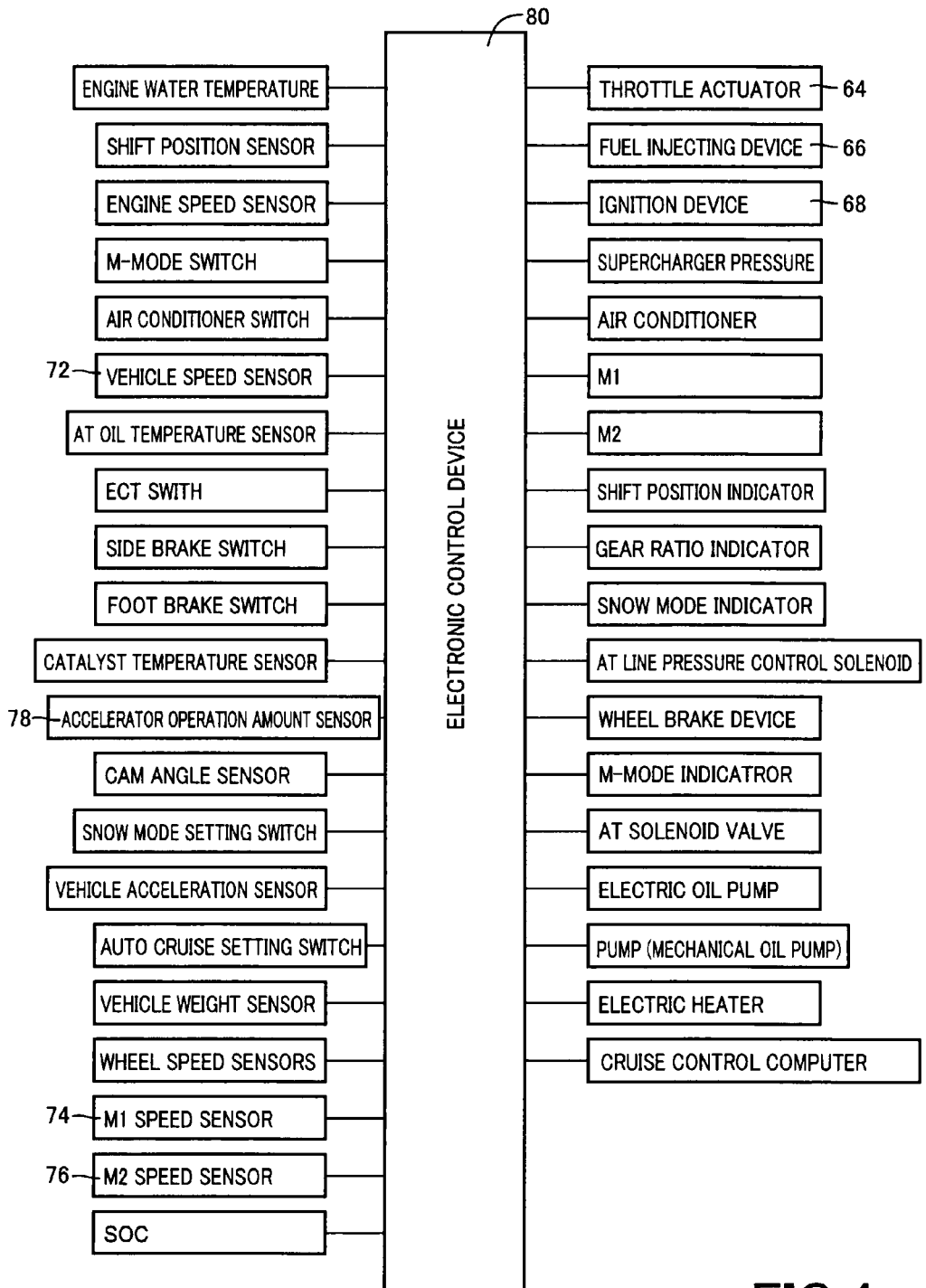
FIG. 4 is a view indicating input and output signals of an electronic control device provided for controlling the vehicular power transmitting system of FIG. 1.

FIG. 4 illustrates signals received by an electronic control device 80 also functioning as a shifting control apparatus for the power transmitting system 10, and signals generated by the electronic control device 80. This electronic control device 80 includes a so-called microcomputer incorporating a CPU, a ROM, a RAM and an input/output interface and the like, and is arranged to process the signals according to programs stored in the ROM while utilizing a temporary data storage function of the RAM, to implement hybrid drive controls of the engine 8 and first and second electric motors M1 and M2, and other controls such as a shifting control of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of shift positions $P_{SH}$ of a shift lever operable by a vehicle operator; a signal indicative of the number of operations of the shift lever 52 from a position M; a signal indicative of the operating speed $N_E$ of the engine 8; a signal indicative of an M mode (manual shifting mode); a signal indicative of an operated state of an air conditioner; a signal indicative of the vehicle running speed V corresponding to the rotating speed $N_{OUT}$ of the output shaft 22 (hereinafter referred to as "output shaft speed $N_{OUT}$") detected by a vehicle speed sensor 72 and the direction of the vehicle 6; a signal indicative of a temperature $T_{OIL}$ of the working oil of the automatic transmission portion 20; a signal indicative of an operated state of a side brake; a signal indicative of an operated state $B_{ON}$ of a brake pedal, which signal indicates an operated state of a foot brake device (wheel braking system) well known as a braking device to brake the vehicle wheels (drive wheels 34, and driven wheels not shown); a signal indicative of a temperature of a catalyst; a signal indicative of an operator's required amount of an output of the vehicle in the form of an amount of operation $A_{CC}$ of an accelerator pedal; a signal indicative of an angle of a cam; a signal indicative of the selection of a snow drive mode; a signal indicative of a longitudinal acceleration value G of the vehicle 6; a signal indicative of the selection of an auto-cruising drive mode; a signal indicative of a weight of the vehicle 6; signals indicative of speeds of the wheels of the vehicle; a signal indicative of an operating speed $N_{M1}$ of the first electric motor M1 (hereinafter referred to as "first electric motor speed $N_{M1}$") detected by an M1 speed sensor 74 (which may be a resolver), and also indicative of a direction of operation of the first electric motor M1; a signal indicative of an operating speed $N_{M2}$ of the second electric motor M2 (hereinafter referred to as "second electric motor speed $N_{M2}$") detected by an M2 speed sensor 76 (which may be a resolver), and also indicative of a direction of operation of the second electric motor M2; and a signal indicative of a stored amount of electric energy (charged state) SOC of the electric-energy storage device 56 (shown in FIG. 5) which is charged and discharged through the inverter 54 between the electric motors M1, M2

The electronic control device 80 is further arranged to generate various signals such as: control signals to be applied to an engine output control device 58 (shown in FIG. 5) to control an output $P_E$ (in the unit of "kW", for example) of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected shift position (operating position); a signal to operate a gear-ratio indicator for indicating the gear ratio; a signal to operate a snow-mode indicator for indicating the selection of the snow drive mode; a signal to operate the wheel braking system; a signal to operate an M-mode indicator for indicating the selection of the M-mode; signals to operate solenoid-operated valves incorporated in a hydraulic control unit 70 (shown in FIG. 5) provided to control the hydraulic actuators of the hydraulically operated frictional coupling devices of the differential portion 11 and automatic transmission portion 20; a signal to operate a regulator valve (adjusting valve) incorporated in the hydraulic control unit 70, to regulate a line pressure; a signal to control an electrically operated oil pump which is a hydraulic pressure source for generating a hydraulic pressure that is regulated into the line pressure; a signal to drive an electric heater; a signal to be applied to a cruise-control computer.

The functional block diagram of FIG. 5 shows major control functions of the electronic control device 80. As shown in FIG. 5, the electronic control device 80 is provided with a step-variable shifting control portion in the form of step-variable shifting control means 82, a memory portion in the form of memory means 84, a hybrid control portion in the form of hybrid control means 86, and a coasting-state determining portion in the form of coasting-state determining means 90.

Figure 6:
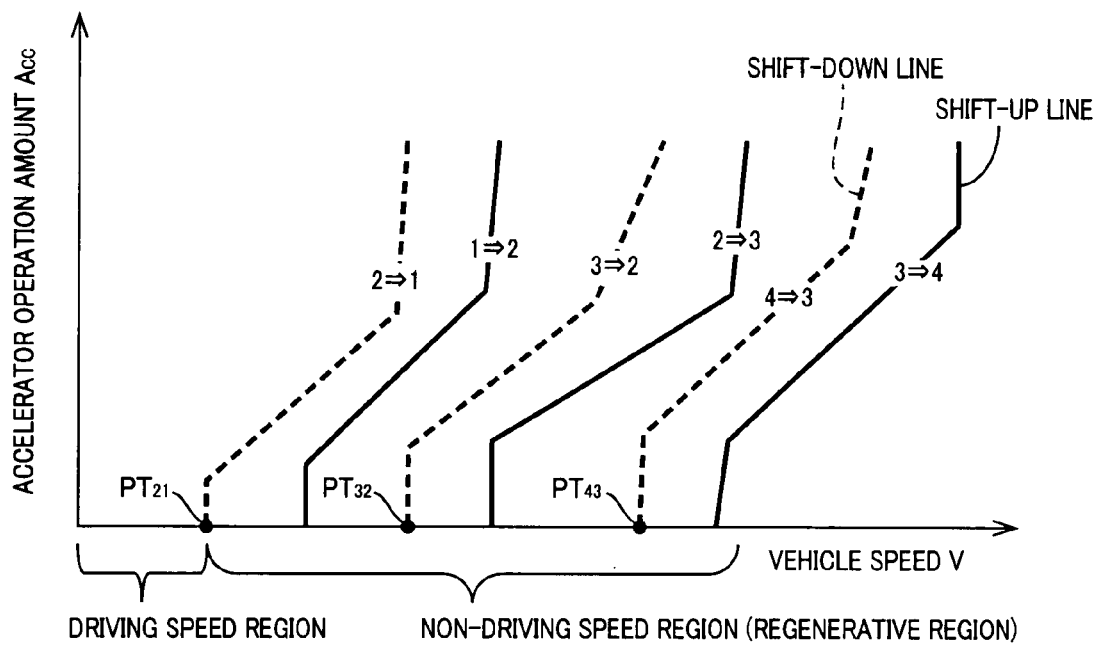
FIG. 6 is a view illustrating an example of a stored shifting line map which is used for determining a shifting action of the automatic transmission portion of the vehicular power transmitting system of FIG. 1, and in which a vehicle running speed and an accelerator pedal operation amount are used as variables.

The step-variable shifting control means 82 functions as a shifting control means to control shifting actions of the automatic transmission portion 20. The step-variable shifting control means 82 is configured to determine whether a shifting action of the automatic transmission portion 20 should be performed, that is, to determine the shift position to which the automatic transmission portion 20 should be shifted. This determination is made on the basis of a condition of the vehicle represented by the actual vehicle running speed V and the accelerator pedal operation amount $A_{CC}$, and according to a relation (shifting lines or shifting map) of FIG. 6 between selected variables (parameters taken along respective axes) in the form of the vehicle speed V and the accelerator pedal operation amount $A_{CC}$. This relation is stored in the memory means 84, and represents shift-up lines (indicated by solid lines in FIG. 6) and shift-down lines (indicated by one-dot chain lines in FIG. 6). The step-variable shifting control means 82 implements an automatic shifting control to shift the automatic transmission portion 20 to the determined shift position. Described in detail by reference to FIG. 6, solid lines indicate shifting lines for shift-up operations (shift-up lines), while broken lines indicate shifting lines for shift-down operations (shift-down lines). The shift-up lines and shift-down lines are obtained by experimentation, so as to improve the fuel economy and drivability of the vehicle 6, for example. The shifting lines in the shifting line map of FIG. 6 are provided to determine, for example, whether a point representative of the actual vehicle speed V has moved across any one of the shifting lines, along a horizontal line representative of the actual accelerator pedal operation amount $A_{CC}$, or to determine whether a point representative of the actual accelerator pedal operation amount $A_{CC}$ has moved across any one of the shifting lines, along a vertical line representative of the actual vehicle speed V, that is, to determine whether the point representative of the actual vehicle speed V or accelerator pedal operation amount $A_{CC}$ has passed a point on any shifting line (shifting point). Each shifting line is a series of the shifting points stored in the memory means 84. In the shifting line map of FIG. 6, the accelerator pedal operation amount $A_{CC}$ directly representing the vehicle-operator's required vehicle drive force is used as one of the parameters taken along the axes, so that the automatic transmission portion 20 can be shifted with a high degree of response to a transient change of the accelerator pedal operation amount $A_{CC}$, that is, to a transient change of the above-indicated required vehicle drive force.

Referring to a coasting run of the vehicle with the accelerator pedal held in the off state, as seen in FIG. 6, the step-variable shifting control means 82 is considered to control the automatic transmission portion 20 to perform each of coasting shift-down operations at a corresponding one of predetermined different coasting shift-down vehicle speed values $V_{CD}$ during the coasting run. Each coasting shift-down vehicle speed value $V_{CD}$ indicated above is a vehicle speed value V on the corresponding shift-down line, which corresponds to the accelerator pedal operation amount $A_{CC}$ of zero, namely, a vehicle speed value V at which it is determined that the automatic transmission portion 20 should be shifted down during coasting run. Described in detail, the step-variable shifting control means 82 controls the automatic transmission portion 20 during the coasting run of the vehicle 6 in a decelerating state, to perform the coasting shift-down operation from the $4^{th}$ position to the $3^{rd}$ position at the coasting shift-down vehicle speed value $V_{CD}$ indicated as a coasting shift-down point $PT_{43}$ in FIG. 6, to perform the coasting shift-down operation from the $3^{rd}$ position to the $2^{nd}$ position at the coasting shift-down vehicle speed value $V_{CD}$ indicated as a coasting shift-down point $PT_{32}$ in FIG. 6, and to perform the coasting shift-down operation from the $2^{nd}$ position to the $1^{st}$ position at the coasting shift-down vehicle speed value $V_{CD}$ indicated as a coasting shift-down point $PT_{21}$ in FIG. 6. In this respect, it is noted that the coasting shift-down vehicle speed values $V_{CD}$ may be changed according to a regenerative power $P_{M2R}$ of the second electric motor M2. This aspect will be described later. The above-described coasting shift-down operations are shift-down operations of the automatic transmission portion 20 to be performed in the coasting state of the vehicle. The coasting shift-down points $PT_{43}$, $PT_{32}$, $PT_{21}$ indicated in FIG. 6 are shifting points at which the coasting shift-down operations from the $4^{th}$ position to the $3^{rd}$ position, from the $3^{rd}$ position to the $2^{nd}$ position, and from the $2^{nd}$ position to the $1^{st}$ position take place, respectively.

When the step-variable shifting control means 82 implements the above-indicated automatic shifting control of the automatic transmission portion 20, the step-variable shifting control means 82 generates a command (shifting control command or hydraulic command) to be applied to the hydraulic control unit 70, to engage and release the hydraulically operated frictional coupling devices for establishing the determined gear position of the automatic transmission portion 20 according to the table of FIG. 2. Namely, the step-variable shifting control portion 82 commands the hydraulic control unit 70 to perform a clutch-to-clutch shifting operation involving a releasing action and an engaging action of the appropriate two frictional coupling devices for establishing the determined gear position of the automatic transmission portion 20. According to the received command, the hydraulic control unit 70 controls the corresponding two linear solenoid valves incorporated therein, for activating the appropriate hydraulic actuators of the appropriate two frictional coupling devices to concurrently engage one of the two frictional coupling devices and release the other frictional coupling device, to effect the clutch-to-clutch shifting operation of the automatic transmission portion 20 to the determined gear position.

The hybrid control means 86 has a function as engine drive control means for controlling the engine 8 through the engine output control device 58, and a function as electric motor control means for controlling the first electric motor M1 and second electric motor M2 to operate as the drive power source or electric generator through the inverter 54, and is configured to implement hybrid drive controls of the engine 8 and the first and second electric motors M1, M2.

The hybrid control means 86 controls the engine 8 to be operated in an operating range of high efficiency, and controls the first and second electric motors M1, M2 so as to optimize a proportion of drive forces generated by the engine 8 and the second electric motor M2, and a reaction force generated by the first electric motor M1, for thereby controlling the speed ratio γ0 of the differential portion 11 operating as the electric continuously-variable transmission. For instance, the hybrid control portion 84 calculates a target (required) output of the vehicle 6 at the present vehicle running speed V, on the basis of the accelerator pedal operation amount $A_{CC}$ used as the operator's required vehicle output and the vehicle running speed V, and calculates a target total vehicle output required on the basis of the calculated target vehicle output and a required amount of generation of an electric energy to be stored. The hybrid control means 86 calculates a target output (required engine output) of the engine 8 to obtain the calculated target total vehicle output, while taking account of a power transmission loss, a load acting on various devices of the vehicle, an assisting torque generated by the second electric motor M2, etc. The hybrid control means 84 controls the speed $N_E$ and torque $T_E$ of the engine 8, so as to obtain the calculated target engine output $P_{ER}$, and the amount of output or generation of the electric energy.

As described above, the overall speed ratio γT of the power transmitting system 10 as a whole is determined by the speed ratio $\gamma_A$ of the automatic transmission portion 20 controlled by the step-variable shifting control means 82, and the speed ratio γ0 of the differential portion 11 controlled by the hybrid control means 86. That is, the hybrid control means 86 and the step-variable shifting control means 82 function as shifting control means for controlling the overall speed ratio γT of the power transmitting system 10 as a whole, through the hydraulic control unit 70, engine output control device 58, and first and second electric motors M1, M2, in each of the gear positions available in the selected shift position $P_{SH}$.

For example, the hybrid control means 86 is arranged to implement control of the engine 8 and each electric motor M while taking account of the presently selected gear position of the automatic transmission portion 20, so as to improve the drivability and fuel economy of the vehicle. In this hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the automatic transmission portion 20. That is, a kind of operating curve of the engine 8 such as a highest fuel-economy curve (fuel-economy map or relation) is obtained by experimentation so as to satisfy both of the desired operating efficiency and the highest fuel economy of the engine 8 in the continuously-variable shifting state, and is defined in a two-dimensional coordinate system defined by an axis of the engine speed $N_E$ and an axis of the engine torque $T_E$. The obtained highest fuel economy curve is stored in the memory means 84. The hybrid control means 86 determines a target value of the overall speed ratio γT of the power transmitting system 10, such that an operating point of the engine 8 (hereinafter referred to as "engine operating point") moves along the above-described highest-fuel-economy curve. The target value of the overall speed ratio γT of the power transmitting system 10 permits the engine torque $T_E$ and speed $N_E$ to be controlled so that the engine 8 provides an output $P_E$ necessary for obtaining the target vehicle output (target total vehicle output or required vehicle drive force). The hybrid control portion 86 implements a feedback control to change the output torque $T_{M1}$ of the first electric motor M1 (hereinafter referred to as "first electric motor torque $T_{M1}$"), for thereby controlling the speed ratio γ0 of the differential portion 11, so as to obtain the target value of the overall speed ratio γT, so that the overall speed ratio γT can be controlled within a predetermined range. The engine operating point referred to above is a point which indicates the operating state of the engine 8 as represented by the engine speed $N_E$ and torque $T_E$, and which is located in a two-dimensional coordinate system wherein the engine speed $N_E$ and torque $T_E$ are taken along respective axes. In the present embodiment, the fuel economy is represented by a vehicle running distance per unit amount of fuel consumption, or a fuel consumption ratio (fuel consumption amount/drive wheel output), for example. An improvement of the fuel economy is an increase of the vehicle running distance per unit amount of the fuel consumption, or a decrease of a fuel consumption ratio (=fuel consumption amount/drive wheel output) of the vehicle as a whole. Conversely, a reduction (deterioration) of the fuel economy is a decrease of the vehicle running distance per unit amount of the fuel consumption, or an increase of the fuel consumption ratio of the vehicle as a whole.

In the hybrid control, the hybrid control means 86 controls the inverter 54 such that the electric energy generated by the first electric motor M1 is supplied to the electric-energy storage device 56 and the second electric motor M2 through the inverter 54, for example. That is, a major portion of the drive force produced by the engine 8 (engine output $P_E$) is mechanically transmitted to the power transmitting member 18, while the remaining portion of the drive force is consumed by one of the electric motors M for generation to convert this portion into the electric energy, which is supplied through the inverter 54 to the other electric motor M, so that this latter electric motor M is operated with the supplied electric energy, to produce a driving force to be transmitted to the power transmitting member 18. Thus, the devices associated with the generation of an electric energy by one of the electric motors M concerning to generation and the consumption of this electric energy by the other electric motor M concerning to driving provide an electric path through which the electric energy generated by conversion of a portion of the drive force of the engine 8 is converted into the mechanical energy. That is, the engine output $P_E$ is transmitted through the differential portion 11 to the power transmitting member 18, through two power transmitting paths consisting of a mechanical path in which the engine output $P_E$ is transmitted mechanically from the input shaft 14 and the power transmitting path 18, and the above-described electric path. It is noted that the above-described electric-energy storage device 56 is an electric energy source which can supply the electric power to the first electric motor M1 and second electric motor M2 through the inverter 54, and which can be supplied with the electric power from those electric motors M1, M2 through the inverter 54. That is, the electric-energy storage device 56 is an electric energy source capable of supplying and receiving an electric power to and from each of the first and second electric motors M1, M2. In other words, the electric-energy storage device 56 is the electric-energy source in the form of a battery, such as a lead-acid battery, or capacitor, for example, which is charged by one or both of the first and second electric motors M1, M2 operated by the engine 8 as the electric generator. The first and second electric motors M1, M2 are capable of electric power supply and reception to and from each other through the inverter 54.

The hybrid control means 86 is further arranged to hold the engine speed $N_E$ substantially constant or at a desired value, by controlling the first electric motor speed $N_{M1}$ and/or the second electric motor speed $N_{M2}$, through the electric CVT function of the differential portion 11, irrespective of whether the vehicle 6 is stationary or running. In other words, the hybrid control portion 86 is capable of controlling the first electric motor speed $N_{M1}$ and/or the second electric motor speed $N_{M2}$ as desired, while holding the engine speed $N_E$ substantially constant or at a desired value.

To raise the engine speed $N_E$ during running of the vehicle, for example, the hybrid control means 86 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control means 86 changes the first electric motor speed $N_{M1}$ in a direction opposite to a direction of change of the second electric motor speed $N_{M2}$ caused by the shifting action of the automatic transmission portion 20.

The hybrid control means 86 applies control commands to the engine-output control device 58, for commanding the throttle actuator 64 to open and close the electronic throttle valve 62, and commanding the fuel injecting device 66 and the ignition device 68, to control an amount and time of fuel injection by the fuel injecting device 66, and the timing of ignition of the igniter, alone or in combination, for thereby controlling the engine 8 to provide the required engine output $P_E$. That is, the hybrid control means 86 functions as engine drive control means for controlling the engine 8.

For instance, the hybrid control means 86 is basically arranged to control the throttle actuator 64 on the basis of the accelerator pedal operation amount $A_{CC}$ and according to a predetermined stored relationship (not shown) between the operation amount $A_{CC}$ and the throttle valve opening angle $\theta_{TH}$ such that the opening angle $\theta_{TH}$ increases with an increase of the operation amount $A_{CC}$. The engine output control device 58 implements an engine torque control according to the commands received from the hybrid control means 86, by controlling the throttle actuator 64 to open and close the electronic throttle valve 62, controlling the fuel injecting device 66 to control the fuel injection, and controlling the ignition device 68 to control the ignition timing of the igniter.

The hybrid control means 86 selects one of the motor drive establishes motor drive mode (EV drive mode) to drive the vehicle with the second electric motor M2 being used as the vehicle drive power source, for example, without using the engine 8, by utilizing the electric CVT function (differential function) of the differential portion 11, irrespective of whether the engine 8 is in the non-operated state or in the idling state. For example, a drive-power-source switching line (drive-power-source map) not shown, which is defined in a two-dimensional coordinate system having axes of variables in the form of the vehicle speed V and accelerator pedal operation amount $A_{CC}$, is stored in the memory means 84. This drive-power-source switching line represents an engine drive region in which a so-called engine drive mode is selected for starting and driving (hereinafter referred to as "driving") the vehicle 6 with the engine 8 operated as the vehicle drive power source, and a motor drive region in which a so-called motor drive mode is selected for driving the vehicle 6 with the second electric motor M2 operated as the vehicle drive power source. The hybrid control means 86 determines, according to the drive-power-source switching line, whether the vehicle running state represented by the actual vehicle speed V and the actual accelerator pedal operation amount $A_{CC}$ is located in the motor drive region or in the engine drive region, and establishes the motor drive mode or the engine drive mode according to a result of the determination. The above-described drive-power-source switching line is formulated so that the motor drive mode is established when the engine operating efficiency is relatively low, namely, when the accelerator pedal operation amount $A_{CC}$ is relatively small, that is, when the engine torque $T_E$ is comparatively small or when the vehicle speed V is comparatively low, that is, when the vehicle is running in a low-load state.

For reducing a dragging of the engine 8 in its non-operated state and improving the fuel economy in the motor drive mode, the hybrid control means 86 is configured to hold the engine speed $N_E$ at zero or substantially zero as needed, owing to the electric CVT function (differential function) of the differential portion 11, by placing the first electric motor M1 in a non-load state, so as to be freely rotated at a negative speed $N_{M1}$.

The hybrid control means 86 is further capable of performing a so-called "torque assisting" operation to assist the engine 8, even in the engine drive region in which engine drive mode is established and engine 8 serves as a drive power source, by supplying an electric energy from the first electric motor M1 and/or the electric-energy storage device 56 to the second electric motor M2 through the above-described electric path, so that the second electric motor M2 is operated to transmit a drive torque to the drive wheels 34. Thus, in the engine drive mode of the present embodiment, the vehicle can be driven by the engine 8 used as the vehicle drive power source, or by both of the engine 8 and the second electric motor M2 used as the vehicle drive power source. In the motor drive mode of the embodiment, the vehicle is driven by the second electric motor M2 used as the vehicle drive power source, while the engine 8 is held at rest.

The hybrid control means 86 is provided with an engine start/stop control portion in the form of engine start/stop control means 88 configured to switch the state of the engine 8 between the operating state and the non-operating state, for switching the vehicle running mode between the engine drive mode and the motor drive mode, namely, to start and stop the engine 8. This engine start/stop control means 88 starts or stops the engine 8 when the hybrid control means 86 has determined to switch the vehicle running mode from the motor drive mode to the engine drive mode or vice versa on the basis of the vehicle running state and according to the above-described drive-power-source switching line.

For instance, the engine start/stop control means 88 starts the engine 8 for switching the vehicle running mode from the motor drive mode to the engine drive mode, when the hybrid control means 86 has determined to switch the vehicle drive mode from the motor drive mode to the engine drive mode, as a result of the determination that the vehicle running state has changed from the motor drive region of the above-described drive-power-source switching line to the engine drive region, with an increase of the accelerator pedal operation amount $A_{CC}$ as a result of an operation of the accelerator pedal, that is, when the hybrid control means 86 has determined to start the engine. The engine start/stop control means 88 starts the engine 8 by implementing an engine drive control in which the first electric motor M1 is energized to raise the first electric motor speed $N_{M1}$, namely, the first electric motor M1 is operated as an engine starter, to raise the engine speed $N_E$ to a value not lower than a predetermined complete combustion value $N_E'$, for example, to a predetermined self-operable speed value $N_{EIDL}$ higher than the idling speed, at which the engine 8 can continue to operate by itself, and at the same time implementing an engine torque generation control in which the fuel is supplied (injected) by the fuel injecting device 66, and is ignited by the ignition device 68, to generate the engine torque $T_E$, while the engine speed $N_E$ is held at the speed not lower than the predetermined complete combustion value $N_E'$. The engine start/stop control means 88 stops the engine 8 by stopping the fuel supply from the fuel injecting device 66, that is, by implementing a fuel cut control, for switching the vehicle running state from the engine drive mode to the motor drive mode when the hybrid control means 86 has determined that the vehicle running state has changed from the engine drive region of the above-described drive-power-source switching line to the motor drive region, with a decrease of the accelerator pedal operation amount $A_{CC}$ as a result of a releasing action of the accelerator pedal.

The hybrid control means 86 is further configured to place the first electric motor M1 in a non-load state in which the first electric motor M1 is freely rotated, so that the differential portion 11 is placed in a state similar to the torque cut-off state in which power cannot be transmitted through the power transmitting path within the differential portion 11, and no output can be generated from the differential portion 11. Namely, the hybrid control means 86 is arranged to place the first electric motor M1 in the non-load state, for thereby placing the differential portion 11 in a neutral state in which the power transmitting path is electrically cut off.

The hybrid control portion 86 is also configured to implement a regenerative control with the engine 8 non-driving state to improve the fuel economy (to reduce fuel consumption ratio) during coasting of the vehicle with the accelerator pedal held in the off state, or during brake application to the vehicle wheels by operation of the brake pedal. In the regenerative control, the hybrid control means 86 operates the second electric motor M2 as an electric generator with a reverse drive force transmitted from the drive wheels 34 toward the engine 8, to regenerate an electric energy, that is, the regenerative power $P_{M2R}$ of the second electric motor M2 (referred to as "second electric motor regenerative power $P_{M2R}$", the unit of which is "kW", for example) used to charge the electric-energy storage device 56. Namely, the electric-energy storage device 56 is charged with an electric current generated by the second electric motor M2 operated as the electric generator, through the inverter 54. Thus, the hybrid control means 86 functions as regenerative control means for implementing the above-described regenerative control in which an electric energy is regenerated by the second electric motor M2 in a coasting state of the vehicle. It is noted that the second electric motor regenerative power $P_{M2R}$ has a positive direction in the direction of regeneration.

Figure 9:
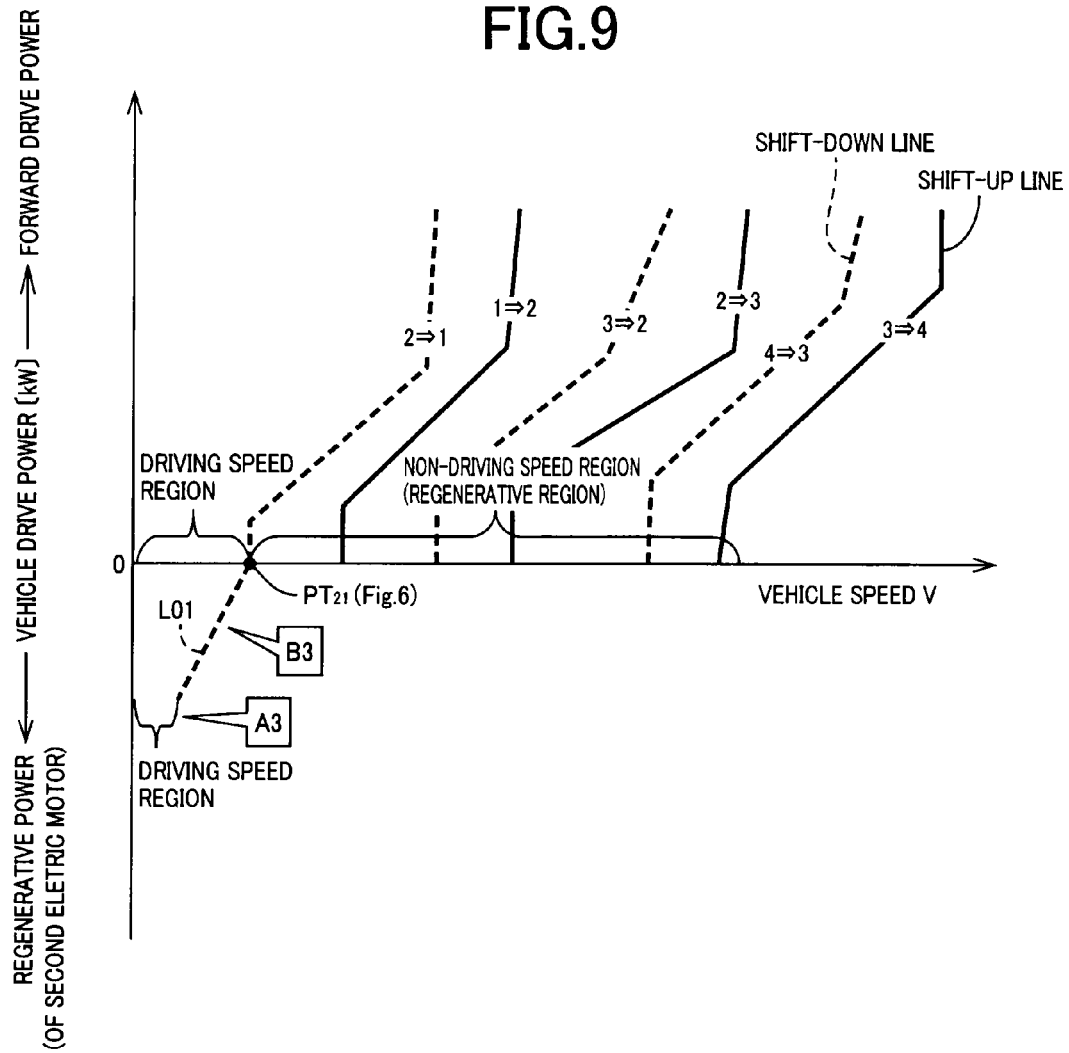
FIG. 9 is a view illustrating a coasting region map defining a drive region and a driven region of the vehicular power transmitting system of FIG. 1 in the vehicle coasting state on a regenerative power side, and a shifting line for a coasting shift-down operation from the second gear position ($2^{nd}$) to the first gear position (1$^{st}$), the coasting region map and the shifting line being superposed on each other.

The hybrid control means 86 also functions as creep running control means for controlling the output torque $T_{OUT}$ of the automatic transmission portion 20 so as to establish a creep running mode in a coasting state of the vehicle at a relatively low running speed. Described in detail, during coasting state of the vehicle, the hybrid control means 86 controls the second electric motor M2 to function as the electric generator to perform a regenerative operation while the vehicle speed is higher than a predetermined drive/driven switching vehicle speed value $V1_{CR}$, and to function as the drive motor to generate a vehicle drive torque while the vehicle speed is lower than the predetermined drive/driven switching vehicle speed value $V1_{CR}$. The hybrid control means 86 controls an output torque $T_{M2}$ of the second electric motor M2 (hereinafter referred to as "second electric motor torque $T_{M2}$") so that the vehicle speed V coincides with the above-described drive/driven switching vehicle speed value $V1_{CR}$. Namely, in the coasting state of the vehicle, a range of the vehicle speed V higher than a boundary vehicle speed in the form of the drive/driven switching vehicle speed value $V1_{CR}$ is a driven speed region (regenerative region) in which the second electric motor M2 performs the regenerative operation, while a range of the vehicle speed V lower than the drive/driven switching vehicle speed value $V_{1CR}$ is a driving speed region in which the second electric motor M2 generates the vehicle drive torque. The above-described drive/driven switching vehicle speed value $V1_{CR}$ is a value of the vehicle speed V obtained by experimentation such that the vehicle operator does not feel anxious about a running of the vehicle in the creep running mode as compared with that of a common engine-driven vehicle having an automatic transmission and a torque converter. That is, the drive/driven switching vehicle speed value $V1_{CR}$ is set to be equal or almost equal to a vehicle speed value V at the coasting shift-down point $PT_{21}$ at which the coasting shift-down operation from the $2^{nd}$ position to the $1^{st}$ position (lowest-speed position), namely, the coasting shift-down vehicle speed value $V_{CD}$ at which the automatic transmission portion 20 is shifted down to the lowest-speed position ($1^{st}$ position). Accordingly, in FIG. 6, the vehicle speed range in which the vehicle is in the coasting state with the automatic transmission portion 20 placed in one of the $2^{nd}$ through $4^{th}$ gear positions is the above-described driven region (regenerative region), while the vehicle speed range in which the vehicle is in the coasting state with the automatic transmission portion 20 placed in the $1^{st}$ gear position is the above-described driving speed region. The hybrid control means 86 is further configured to set the above-described drive/driven switching vehicle speed value $V1_{CR}$ such that the drive/driven switching vehicle speed value $V1_{CR}$ decreases with an increase of the second electric motor regenerative power $P_{M2R}$, in other words, with an increase of the deceleration value of the vehicle 6, in the vehicle coasting state, in order to maximize the opportunity of the regenerative operation of the second electric motor M2 for improving the fuel economy of the vehicle. It will be understood from FIG. 6 that the above-described driven speed region is enlarged with a decrease of the drive/driven switching vehicle speed value $V1_{CR}$, while the above-described driving speed region is reduced with the decrease of this vehicle speed value $V1_{CR}$. In FIG. 9, an arrow A3 indicates a point to which the drive/driven switching vehicle speed value $V1_{CR}$ is decreased to reduce the above-described driving speed region with the increase of the second electric motor regenerative power $P_{M2R}$ in the vehicle coasting state. For instance, the above-described drive/driven switching vehicle speed value $V1_{CR}$ is set to be about 10 km/h in a coasting state with substantially no regenerative operation of the second electric motor M2, and is set to be as low as about 4 km/h with the increase of the deceleration value of the vehicle 6.

Figure 7:
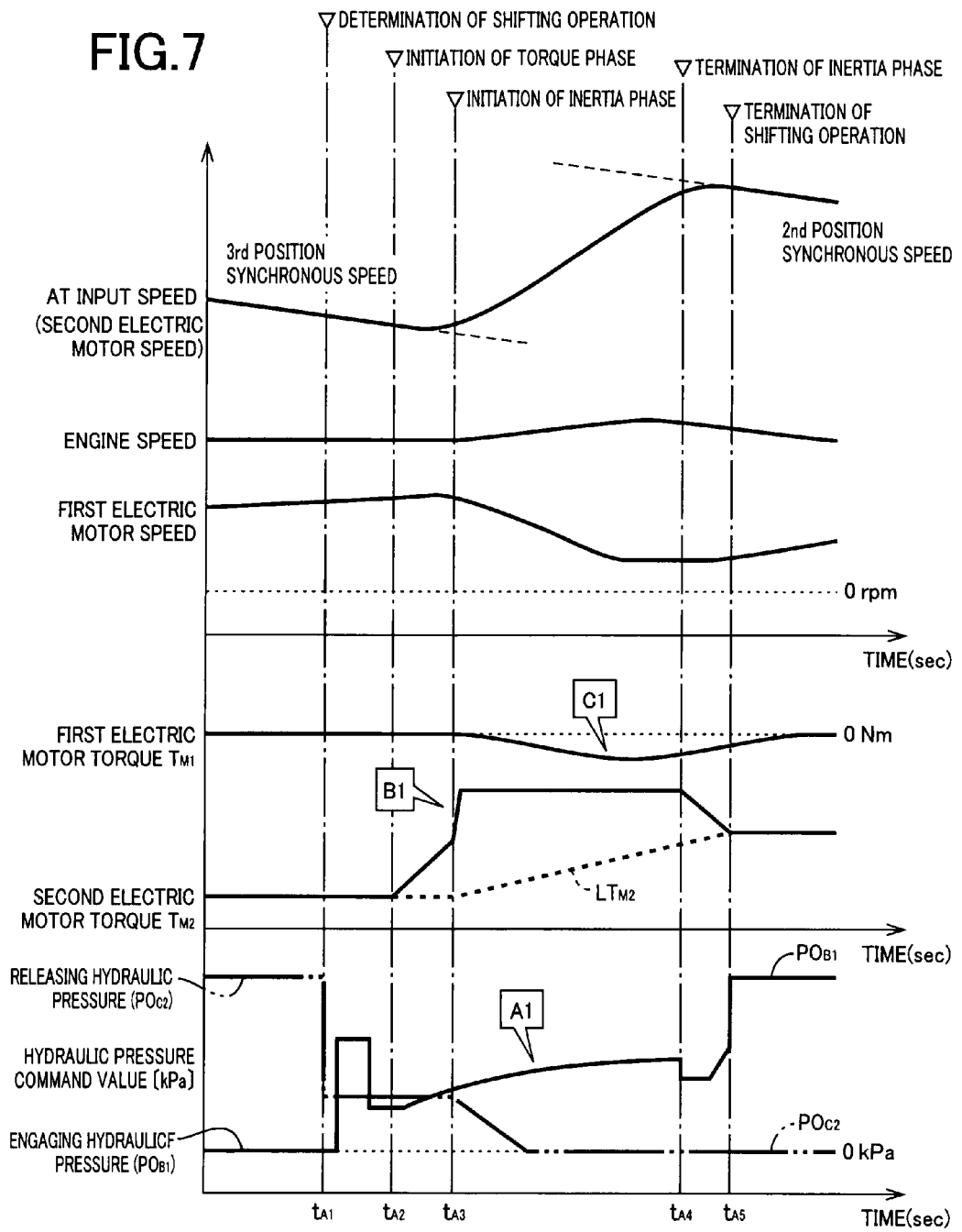
FIG. 7 is a time chart for explaining a coasting shift-down operation of the automatic transmission portion of the vehicular power transmitting system of FIG. 1 from a third gear position ($3^{rd}$) to a second gear position ($2^{nd}$) as an example in which the second electric motor performs a regenerative operation before and after, and during the coasting shift-down operation of the automatic transmission portion.
Figure 8:
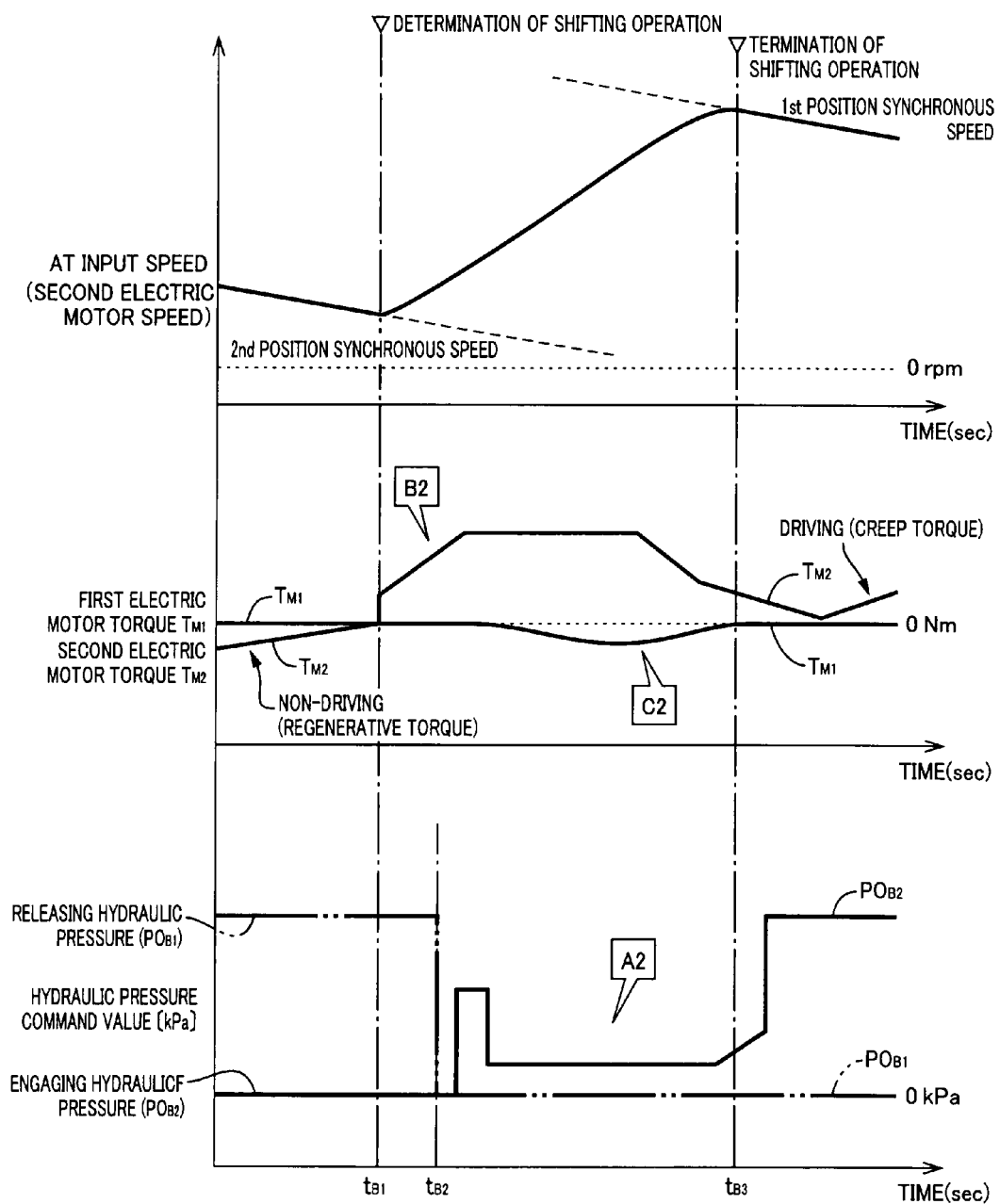
FIG. 8 is a time chart for explaining a coasting shift-down operation of the automatic transmission portion of the vehicular power transmitting system of FIG. 1 from the second gear position ($2^{nd}$) to a first gear position ($1^{st}$).

Referring next to FIGS. 7 and 8, the shift-down operations of the automatic transmission portion 20 in the vehicle coasting state (coasting shift-down operations) will be described. FIG. 7 is the time chart for explaining the coasting shift-down operation of the automatic transmission portion 20 from the third gear position ($3^{rd}$) to the second gear position ($2^{nd}$) as an example in which the second electric motor M2 performs the regenerative operation before and after, and during the coasting shift-down operation of the automatic transmission portion 20. FIG. 8 is the time chart for explaining the coasting shift-down operation of the automatic transmission portion 20 from the second gear position ($2^{nd}$) to the first gear position ($1^{st}$). In both of the examples of FIGS. 7 and 8, the vehicle 6 is in a decelerating state with the accelerator pedal held in the off state. As is apparent from FIG. 1, in the present embodiment, the AT input speed $N_{ATIN}$, the second electric motor speed $N_{M2}$ and the transmitting-member speed $N_{18}$ are equal to each other.

In FIG. 7, a point of time $t_{A1}$ is a moment at which the step-variable shifting control means 82 has determined that the shift-down operation of the automatic transmission portion 20 from the third gear position ($3^{rd}$) to the second gear position ($2^{nd}$) should be performed. Upon determination of this determination, the step-variable shifting control means 82 applies a shifting command to the hydraulic control unit 70, so that at the point of time $t_{A1}$, a hydraulic pressure $PO_{C2}$ (releasing hydraulic pressure) of the second clutch C2 serving as the coupling element selected to be released begins to be lowered, while a hydraulic pressure $PO_{B1}$ (engaging hydraulic pressure) of the first brake B1 serving as the coupling element selected to be engaged begins to be raised.

A point of time $t_{A2}$ is a moment at which a torque phase is initiated, while a point of time $t_{A3}$ is a moment at which the torque phase is terminated and an inertia phase is initiated. A point of time $t_{A4}$ is a moment at which the inertia phase is terminated. A point of time $t_{A5}$ is a moment at which the shifting control of the automatic transmission portion 20 is terminated. In the inertia phase from the point of time $t_{A3}$ to the point of time $t_{A4}$, the step-variable shifting control means 82 releases the coupling element (second clutch C2) selected to be released, and controls the engaging hydraulic pressure of the coupling element (first brake B1) selected to be engaged, such that the coupling element selected to be engaged is placed in a slipping state (as indicated by an arrow A1), that is seen from variation of releasing pressure and engaging pressure. Accordingly, the AT input speed $N_{ATIN}$ is raised, in the inertia phase, to a value to be established after the shift-down operation. Namely, the AT input speed $N_{ATIN}$ is raised from the $3^{rd}$ position (a shift position before shifting) synchronous speed to the $2^{nd}$ position (a shift position after shifting) synchronous speed.

In the vehicle coasting state indicated in the time chart of FIG. 7, the hybrid control means 86 controls the second electric motor M2 to perform a regenerative operation during a time period before the point of time $T_{A1}$ and after a point of time $_{A5}$, which time period includes the period of the shift-down operation, so that the second electric motor torque $T_{M2}$ is a negative torque, that is, a regenerative torque. In the torque phase and inertia phase from the point of time $t_{A2}$ to the point of time $t_{A4}$, the hybrid control means 86 controls the second electric motor torque $T_{M2}$ so as not to be smoothly changed as indicated by broken line $LT_{M2}$, but so as to be once reduced to a point close to zero. Namely, the hybrid control means 86 implements a regenerative torque reduction control (as indicated by an arrow B1) to reduce a regenerative torque $T_{M2R}$ of the second electric motor M2 (hereinafter referred to as "second electric motor regenerative torque $T_{M2R}$") to a value smaller than a value to be established after the shift-down operation. As a result, the amount of reduction of the output torque $T_{OUT}$ of the automatic transmission portion 20 in the torque and inertia phases is reduced to improve the drivability of the vehicle. In the present example, the second electric motor regenerative torque $T_{M2R}$ is indicated such that a direction for regeneration is the positive direction, so that the above-described second electric motor torque $T_{M2}$ and regenerative torque $T_{M2R}$ have the same absolute value, but have the mutually opposite directions.

The hybrid control means 86 is further configured to control the first electric motor torque $T_{M1}$ (as indicated by an arrow C1) so as to cancel the inertia of the first electric motor M1 and the inertia of the differential-portion sun gear S0 connected to the first electric motor M1, for reducing the amount of change of the engine speed $N_E$ during the shift-down operation in the inertia phase.

The coasting shift-down operation of the automatic transmission portion 20 from the fourth gear position ($4^{th}$) to the third gear position ($3^{rd}$) is performed similarly to the coasting shift-down operation of the automatic transmission portion 20 from the third gear position ($3^{rd}$) to the second gear position ($2^{nd}$) in the present example of the time chart of FIG. 7.

Referring next to FIG. 8, a point of time $t_{B1}$ is a moment of initiation of the shifting operation of the automatic transmission portion 20. Namely, at the point of time $t_{B1}$, the step-variable shifting control means 82 has determined that the shift-down operation of the automatic transmission portion 20 from the second gear position ($2^{nd}$) to the first gear position ($1^{st}$) should be performed, and applies a shifting command to the hydraulic control unit 70, so that at a point of time $t_{B2}$, a hydraulic pressure $PO_{B1}$ (releasing hydraulic pressure) of the first brake B1 is zeroed to release the coupling element (first brake B1) selected to be released. Immediately after the point of time $t_{B2}$, a hydraulic pressure $PO_{B2}$ (engaging hydraulic pressure) of the second brake B2 is held at a low standby value at which the second brake B2 is held in its released state while a mechanical clearance of the second brake B2 is eliminated to improve a shifting response. Thus, the step-variable shifting control means 82 releases both of the above-described coupling element to be released (first brake B1) and the above-described coupling element to be engaged (second brake B2), during a time period from the point of time $t_{B2}$ to a point of time $t_{B3}$ corresponding to a time when the shifting is finished, that is, holds both of the two coupling elements in a clutch-free state in which both of the two coupling clutches have no torque capacities, contrary to the manner of control of the two coupling clutches in the example of FIG. 7 described above.

Before the point of time $t_{B1}$, the vehicle speed V is higher than the above-described drive/driven switching vehicle speed value V1$_{CR}$, so that the second electric motor torque T$_{M2}$ is the regenerative torque. In other words, the hybrid control means 86 terminates the regenerative operation of the second electric motor M2 before the point of time t$_{B1}$ (moment of initiation of the shifting operation). That is, the vehicle speed V is lowered to the above-described drive/driven switching vehicle speed value V1$_{CR}$ at the point of time t$_{B1}$. The coasting shift-down operation from the second gear position to the first gear position indicated in FIG. 8 is different from the coasting shift-down operation of FIG. 7 in that the second electric motor M2 is not controlled to perform the regenerative operation during the coasting shift-down operation of FIG. 8 (from the point of time t$_{B1}$ to the point of time T$_{B3}$) and after this coasting shift-down operation. During a time period from the point of time t$_{B1}$ (moment of initiation of the shifting operation) to the point of time t$_{B3}$ (moment of termination of the shifting operation), the hybrid control means 86 controls the second electric motor M2 to function as the vehicle drive motor for generating a vehicle drive torque, to thereby raise the AT input speed N$_{ATIN}$ to a $1^{st}$ position synchronous speed to be established after the shift-down operation. Namely, the hybrid control means 86 functions as synchronization control means for implementing a coasting shift-down synchronization control (as indicated by an arrow B2) to control the second electric motor M2 to control the AT input speed N$_{ATIN}$ to the $1^{st}$ position synchronous speed after the shift-down operation, while the above-described two coupling elements of the automatic transmission portion 20 which are selected to be respectively released and engaged are held released, i.e., in the above-described clutch-free state during a coasting shift-down from $2^{nd}$ position to $1^{st}$ position. At the point of time t$_{B3}$, the AT input speed N$_{ATIN}$ is raised to the $1^{st}$ position synchronous speed, and after the synchronization, the step-variable shifting control means 82 raises the hydraulic pressure PO$_{B2}$ of the second brake B2 to a value for full engagement, that is, places the above-described coupling element selected to be engaged (second brake B2) in the fully engaged state.

The second electric motor torque T$_{M2}$ which is once almost zeroed is increased after the point of time t$_{B3}$ (moment of termination of the shifting operation), since the hybrid control means 86 controls the second electric motor M2 to generate the vehicle drive torque (creep torque) for driving the vehicle in the creep running mode while the vehicle speed is in the above-described driving speed region (indicated in FIG. 6).

As in the inertia phase indicated in FIG. 7, the hybrid control means 86 controls the first electric motor torque T$_{M1}$ (as indicated by an arrow C2) so as to cancel the inertia of the first electric motor M1 and the inertia of the differential-portion sun gear S0 connected to the first electric motor M1, for reducing the amount of change of the engine speed N$_E$ during the shift-down operation during the point of time t$_{B1}$ and the point of time t$_{B3}$.

By the way, the hybrid control means 86 in the present embodiment which is configured to implement the above-described regenerative control for improving the fuel economy in the coasting state of the vehicle is further configured to change the coasting shift-down point for increasing the amount of regeneration under the above-described regenerative control, to improve the fuel economy. This aspect will be described below.

Referring back to FIG. 5, the coasting-state determining means 90 is configured to determine whether the vehicle 6 is presently in a running state in which a coasting shift-down operation of the automatic transmission portion 20 may take place. For example, the determination by the coasting-state determining means 90 that the vehicle 6 is in the running state in which the coasting shift-down operation may take place is made if the automatic transmission portion 20 is placed in any one of the gear positions ($2^{nd}$, $3^{rd}$ and $4^{th}$ positions) higher than the $1^{st}$ gear position (lowest gear position) in a coasting state of the vehicle. The coasting-state determining means 90 may be configured to make the determination that the above-described coasting shift-down operation may take place, if the automatic transmission portion 20 is placed in the above-indicated one of the gear positions in a decelerating state of the vehicle 6.

The coasting-state determining means 90 is further configured to further determine whether the vehicle 6 is presently in a running state in which the coasting shift-down operation of the automatic transmission portion 20 may take place during the regenerative control in which the second electric motor M2 performs a regenerative operation before and after, and during the coasting shift-down operation. As described above by reference to the time chart of FIG. 7, the above-described regenerative control is implemented when the coasting shift-down operation from the $4^{th}$ gear position to the $3^{rd}$ gear position or from the $3^{rd}$ gear position to the $2^{nd}$ gear position is performed. Therefore, the coasting-state determining means 90 makes the determination that the vehicle 6 is presently in the running state in which the coasting shift-down operation may take place during the above-described regenerative control, if the automatic transmission portion 20 is placed in the $4^{th}$ gear position or $3^{rd}$ gear position in the coasting state. Accordingly, the coasting-state determining means 90 does not make the determination that the vehicle 6 is in the running state in which the coasting shift-down operation may take place during the above-described regenerative control, while the automatic transmission portion 20 is placed in the $2^{nd}$ gear position, for example, even if the vehicle 6 is in the coasting state.

The step-variable shifting control means 82 is provided with a coasting shift-down point changing portion in the form of coasting shift-down point changing means 92 for changing the coasting shift-down points PT$_{43}$, PT$_{32}$ and PT$_{21}$. Described in detail, the coasting shift-down point changing means 92 is configured to change the above-described coasting shift-down vehicle speed values V$_{CD}$ in the form of the coasting shift-down points PT$_{43}$, PT$_{32}$ and PT$_{21}$, according to the second electric motor regenerative power P$_{M2R}$ in the coasting state. As described above by reference to FIGS. 7 and 8, the coasting shift-down operation from the $2^{nd}$ gear position to the $1^{st}$ gear position is controlled differently from the coasting shift-down operation from the $4^{th}$ gear position to the $3^{rd}$ gear position and the coasting shift-down operation from the $3^{rd}$ gear position to the $2^{nd}$ gear position. Therefore, the manner of changing the coasting shift-down vehicle speed value V$_{CD}$ in the form of the coasting shift-down point PT$_{21}$ is different from the manner of changing the shift-down vehicle speed values V$_{CD}$ in the form of the coasting shift-down points PT$_{43}$ and PT$_{32}$. The manner of changing the coasting shift-down vehicle speed value V$_{CD}$ in the form of the coasting shift-down point PT$_{21}$ will be described first.

If the coasting-state determining means 90 has determined that the vehicle is in the running state in which a coasting shift-down operation of the automatic transmission portion 20 may take place, and that the vehicle is not in the running state in which the coasting shift-down operation may not take place during the above-described regenerative control, there is a possibility of the subsequent coasting shift-down operation to the $1^{st}$ gear position (lowest gear position). In this case, therefore, the coasting shift-down point changing means 92 changes the coasting shift-down speed value V$_{CD}$ in the form of the coasting shift-down point PT$_{21}$, in other words, the coasting shift-down vehicle speed value $V_{CD}$ used for determining the coasting shift-down operation to the $1^{st}$ gear position (hereinafter referred to as "coasting shift-down vehicle speed value $V1_{CD}$"), according to the second electric motor regenerative power $P_{M2R}$. Described in more detail, the above-described regenerative control is primarily implemented by the second electric motor M2, so that an increase of the vehicle drive power (unit: "kW", for example) in the negative direction along the vertical axis of FIG. 9 means an increase of the second electric motor regenerative power $P_{M2R}$. Therefore, the coasting shift-down point changing means 92 lowers the above-described coasting shift-down vehicle speed point $V1_{CD}$ with an increase of the second electric motor regenerative power $P_{M2R}$ along a coasting shift-down line L01 (broken line), as indicated by an arrow B3 in FIG. 9. In other words, the coasting shift-down point changing means 92 lowers the coasting shift-down point $PT_{21}$ for the coasting shift-down operation of the automatic transmission portion 20 from $2^{nd}$ position to $1^{st}$ position, with an increase of the second electric motor regenerative power $P_{M2R}$. In this case, the coasting shift-down point changing means 92 is preferably configured to change the above-described coasting shift-down vehicle speed value $V1_{CD}$ such that the coasting shift-down vehicle speed value $V1_{CD}$ is equal or substantially equal to the above-described drive/driven switching vehicle speed value $V1_{CR}$ which is set so as to decrease with an increase of the second electric motor regenerative power $P_{M2R}$.

The step-variable shifting control means 82 determines whether the coasting shift-down operation from the $2^{nd}$ gear position to the $1^{st}$ gear position should be performed, on the basis of the coasting shift-down vehicle speed value $V1_{CD}$ which has been changed as indicated in FIG. 9 by the coasting shift-down point changing means 92, and implements the shifting control to perform the coasting shift-down operation from the $2^{nd}$ gear position to the $1^{st}$ gear position. The coasting shift-down value speed value $V1_{CD}$ thus changed permits an increase of the opportunity of the regenerative control of the second electric motor M2, for improving the fuel economy. It is noted that in FIG. 9 the coasting shift-down line L01, which is a series of the coasting shift-down points $PT_{21}$ for the coasting shift-down operation of the automatic transmission portion 20 from the $2^{nd}$ gear position to the $1^{st}$ gear position, is defined in a shifting line map in a two-dimensional coordinate system in which the vehicle speed V and the vehicle drive power that is an output of the vehicle 6 are taken as variables (along the horizontal and vertical axes, respectively). The vehicle drive power indicated in FIG. 9 in the positive direction means a forward drive power in a forward running state of the vehicle with an operation of the accelerator pedal, without a coasting run of the vehicle, in which the automatic transmission portion 20 is shifted according to the shifting lines of FIG. 6. Namely, the shifting lines indicated on the positive side as seen along the vertical axis of FIG. 9 are identical with those in FIG. 6. The vehicle drive power in the positive direction of the above-described vertical axis of FIG. 9 is the forward vehicle drive power, while the vehicle drive power in the negative direction on the other hand is the regenerative power. Since the above-described regenerative control is primarily implemented by the second electric motor M2, the vehicle drive power in the negative direction of the vertical axis of FIG. 9 (regenerative power) is the second electric motor regenerative power $P_{M2R}$.

Then, the coasting shift-down vehicle speed values $V_{CD}$ in the form of the coasting shift-down points $PT_{43}$ and $PT_{32}$ will be described. The second electric motor M2 continues to perform the regenerative operation even after the coasting shift-down operation of the automatic transmission portion 20 performed on the basis of the coasting shift-down point $PT_{43}$ or $PT_{32}$. In this respect, it is desirable that a total loss (unit: "kJ" or "kW", for example) which is an energy loss of the vehicle 6 as a whole during the regenerative control is reduced by the above-described coasting shift-down operation, for improving the fuel economy.

Figure 10:
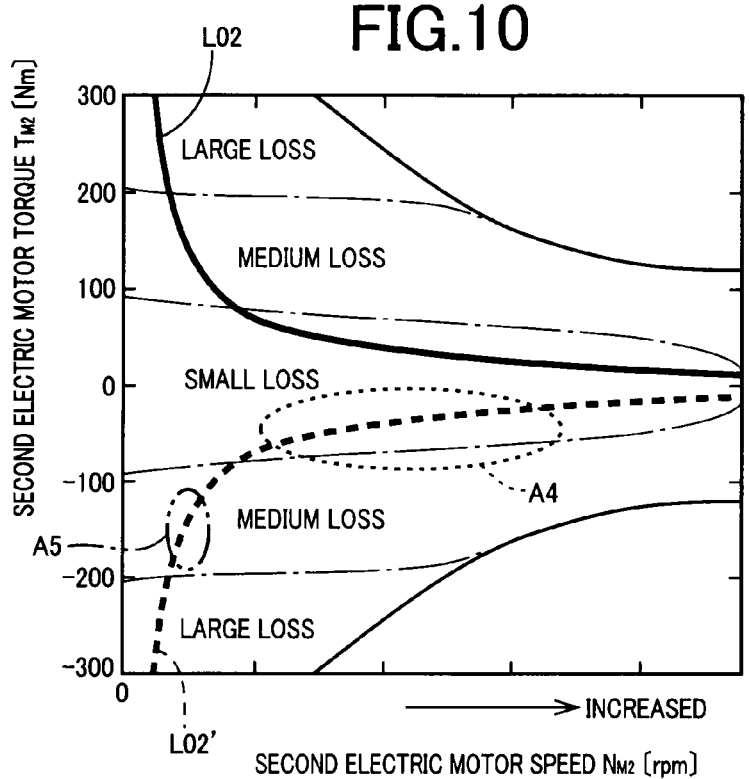
FIG. 10 is a view illustrating a loss map for the second electric motor representing a relationship among operating speed and output torque of the second electric motor of the vehicular power transmitting system of FIG. 1, and an energy loss of the second electric motor.
Figure 11:
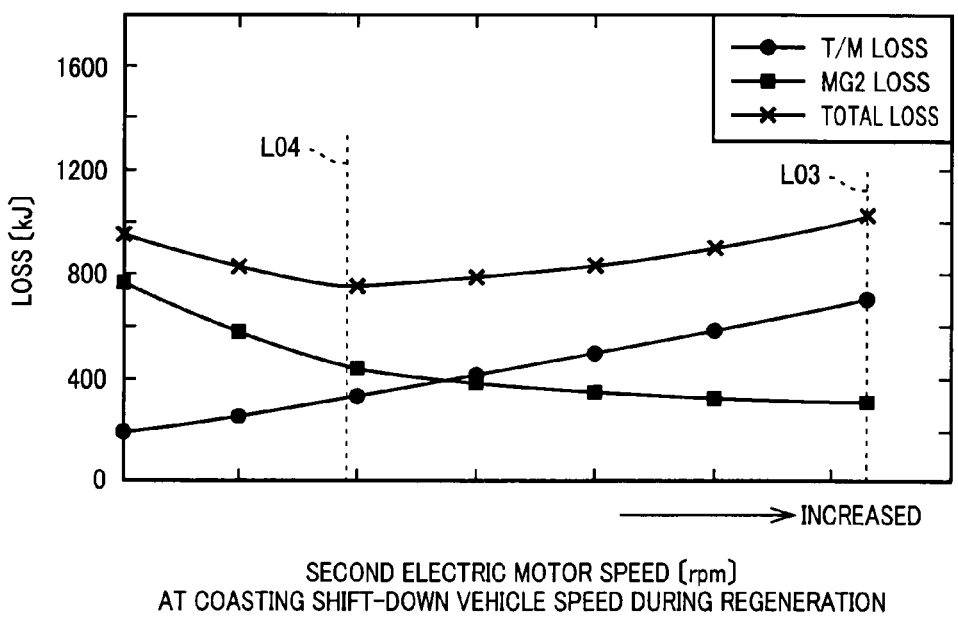
FIG. 11 is a view illustrating a relationship among a total loss, a mechanical transmission loss (T/M loss), and an energy loss of the second electric motor (MG2 loss) in the vehicular power transmitting system of FIG. 1.

FIG. 10 is a second electric motor loss map indicating a relationship among the second electric motor speed $N_{M2}$, the second electric motor torque $T_{M2}$, and an energy loss of the second electric motor M2 (MG2 loss). A solid line L02 and a broken line L02' in FIG. 10 are iso-power curves of about 15 kW. The solid line L02 relates to the forward drive of the vehicle while the broken line L02' relates to the regenerative operation. Even when the coasting shift-down operation of the automatic transmission portion 20 moves an operating point of the second electric motor M2 along the iso-power curve L02' in FIG. 10 in a direction for raising the vehicle speed, for instance, if the operating point of the second electric motor M2 before the shifting is within a region A4 indicated by broken line in FIG. 10, the above-described MG2 loss is reduced. However, the amount of reduction of the MG2 loss is small. On the other hand, a transmission loss (T/M loss) which is a mechanical energy loss of the power transmitting system 10 during the regenerative operation increases with an increase of the second electric motor speed $N_{M2}$, as indicated in FIG. 11. Accordingly, the coasting shift-down operation performed at a relatively high speed of the second electric motor M2 may an increase of the above-described total loss and consequent deterioration of the fuel economy, as indicated by a broken line L03 in FIG. 11. To prevent this increase of the total loss, the coasting shift-down operation is required to be performed at a value of the second electric motor speed $N_{M2}$ which is close to a point at which the above-described total loss indicated by a broken line L04 in FIG. 11, for example, is minimum. In other words, the coasting shift-down operation is required to be performed in an operating state of the second electric motor M2 in which the amount of reduction of the above-described MG2 loss is sufficiently larger than the amount of increase of the above-descried transmission loss. In this respect, the coasting shift-down operation is required to be performed when the operating point of the second electric motor M2 is located at a point on the iso-power curve L02', which lies within a region A5 indicated by a two-dot chain line (in FIG. 10), for example. At the operating point on the iso-power curve L02' within the region A5, substantially no change of the second electric motor speed $N_{M2}$ takes place, but a considerable change of the second electric motor torque $T_{M2}$ takes place. Therefore, the determination as to whether the coasting shift-down operation should be performed is preferably made on the basis of the second electric motor torque $T_{M2}$ rather than the second electric motor speed $N_{M2}$ influencing the vehicle speed V, in order to facilitate and optimize the coasting shift-down operation so as to reduce the total loss. The curves and lines indicated in FIGS. 10 and 11 are given by way of example, and the individual vehicles have curves and lines of respective different characteristics.

As described above by reference to FIGS. 10 and 11, the coasting shift-down point changing means 92 sets the coasting shift-down points $PT_{43}$ and $PT_{32}$ such that the corresponding coasting shift-down operations of the automatic transmission portion 20 are performed under the condition that the second electric motor regenerative torque $T_{M2R}$ generated during the regenerative operation of the second electric motor M2 to be performed under the control of the hybrid control means 86 after the shift-down operations in the coasting state of the vehicle (after the coasting shift-down operations) is equal to or larger than a predetermined torque value $T1_{M2R}$, so that the coasting shift-down operations are performed so as to minimize the above-described total loss. In the present embodiment, the above-described coasting shift-down operations followed by the regenerative operations of the second electric motor M2 are the coasting shift-down operations from the $4^{th}$ gear position to the $3^{rd}$ gear position and from the $3^{rd}$ gear position to the $2^{nd}$ gear position (performed during the regenerative operation). In other words, the coasting shift-down point changing means 92 sets the coasting shift-down points $PT_{43}$ and $PT_{32}$ so that the corresponding coasting shift-down operations are performed under the condition that the second electric motor torque $T_{M2R}$ to be generated is equal to or larger than the predetermined torque value $T1_{M2R}$, in the case where the coasting-state determining means 90 has determined that the vehicle is in a running state in which a coasting shift-down operation of the automatic transmission portion 20 may take place, and that the vehicle is in a running state in which the coasting shift-down operation may take place during the above-described regenerative control. The step-variable shifting control means 82 determines whether the coasting shift-down operation should be performed, on the basis of the coasting shift-down points $PT_{43}$ and $PT_{32}$ set by the coasting shift-down point changing means 92, and implements the shifting control according to a result of the determination. Since the step-variable shifting control means 82 thus implements the shifting control to perform the coasting shift-down operation from the $4^{th}$ gear position to the $3^{rd}$ gear position or from the $3^{rd}$ gear position to the $2^{nd}$ gear position, during the regenerative operation, on the basis of the coasting shift-down point $PT_{43}$ or $PT_{32}$ set by the coasting shift-down point changing means 92, the coasting shift-down operation is performed while the second electric motor torque $T_{M2R}$ is equal to or larger than the predetermined torque value $T1_{M2R}$. The above-described predetermined torque value $T1_{M2R}$ is obtained by experimentation, for each of the coasting shift-down operations, on the basis of the characteristics of the above-described total loss indicated in FIG. 11, so that the coasting shift-down operations are performed during the regenerative control, so as to minimize the total loss. The predetermined torque value $T1_{M2R}$ may be a constant value, or a variable which changes with the vehicle speed V or the second electric regenerative power $P_{M2R}$.

Figure 12:
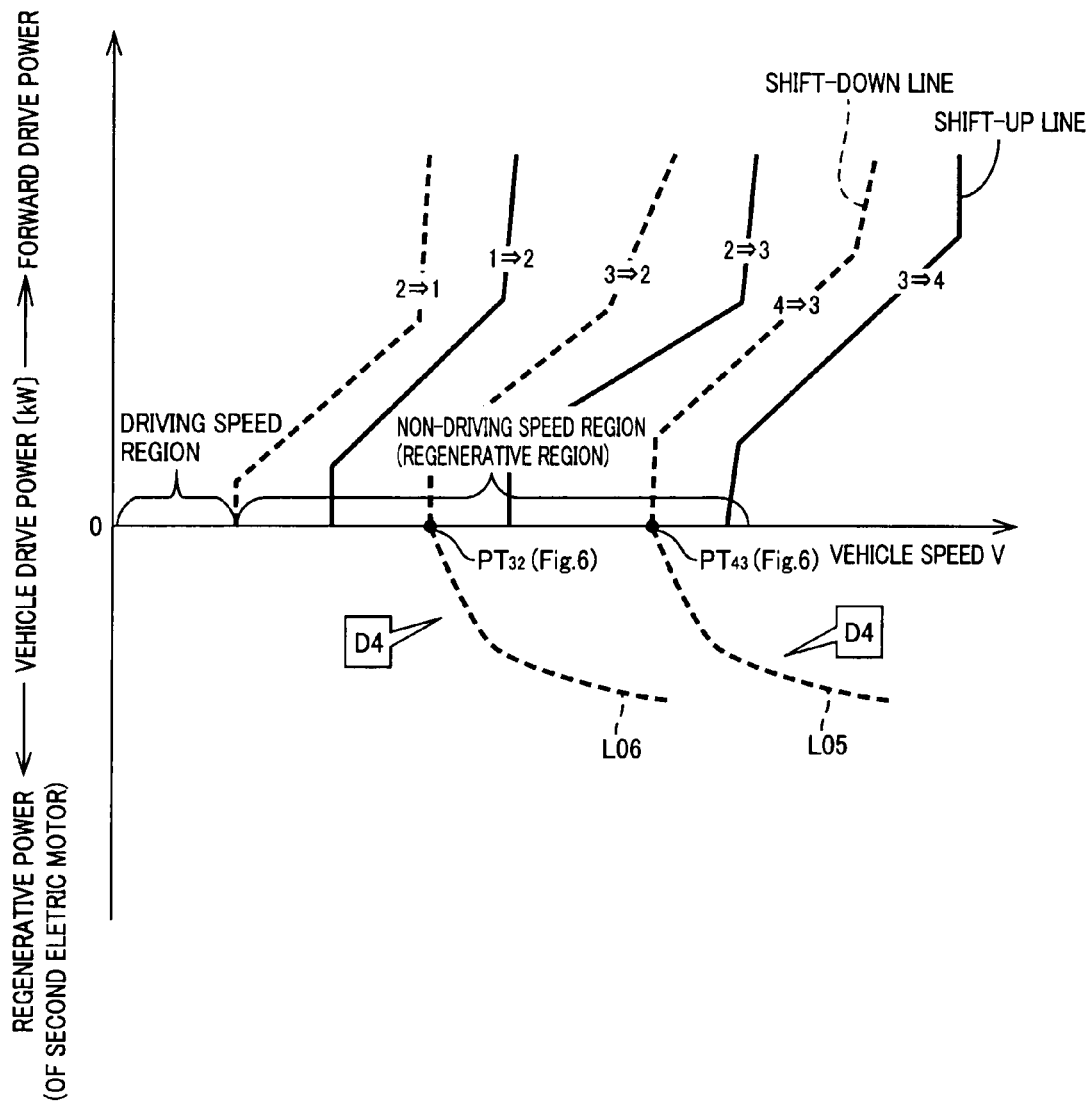
FIG. 12 is a view illustrating a shifting line map for coasting shift-down operations of the automatic transmission portion of the vehicular power transmitting system of FIG. 1 from the 4$^{th}$ gear position to the 3$^{rd}$ gear position and from the 3$^{rd}$ gear position to the 2$^{nd}$ gear position, wherein the vehicle speed V and a negative vehicle drive power (regenerative power of the second electric motor) are used as variables.

FIG. 12 illustrates a shifting line map wherein the vehicle speed V and a negative vehicle drive power (second electric motor regenerative power $P_{M2R}$) are used as variables. As in the shifting line map of FIG. 9, the shifting lines indicated on the positive side as seen along the vertical axis of FIG. 12 are identical with those in FIG. 6.

As described above, the coasting shift-down point changing means 92 sets the coasting shift-down points $PT_{43}$ and $PT_{32}$ on the basis of the second electric motor regenerative torque $T_{M2R}$. In the shifting line map of FIG. 12, a broken line L05 represents a shifting line for the coasting shift-down operation from the $4^{th}$ gear position to the $3^{rd}$ gear position, which shifting line is a series of the coasting shift-down points $PT_{43}$, as indicated by an arrow D4, while a broken line L06 represents a shifting line for the coasting shift-down operation from the $3^{rd}$ gear position to the $2^{nd}$ gear position, which shifting line is a series of the coasting shift-down points $PT_{32}$, as also indicated by an arrow D4. These shifting lines L05 and L06 are given by way of example, and vary depending upon the characteristics relating to the losses of the second electric motor M2 and power transmitting system 10. In the present embodiment, the coasting shift-down point changing means 92 sets the coasting shift-down points $PT_{43}$ and $PT_{32}$ such that the coasting shift-down points $PT_{43}$ and $PT_{32}$ increase with an increase of the second electric motor regenerative power $P_{M2R}$, as indicated by the coasting shift-down shifting lines L05 and L06.

Figure 13:
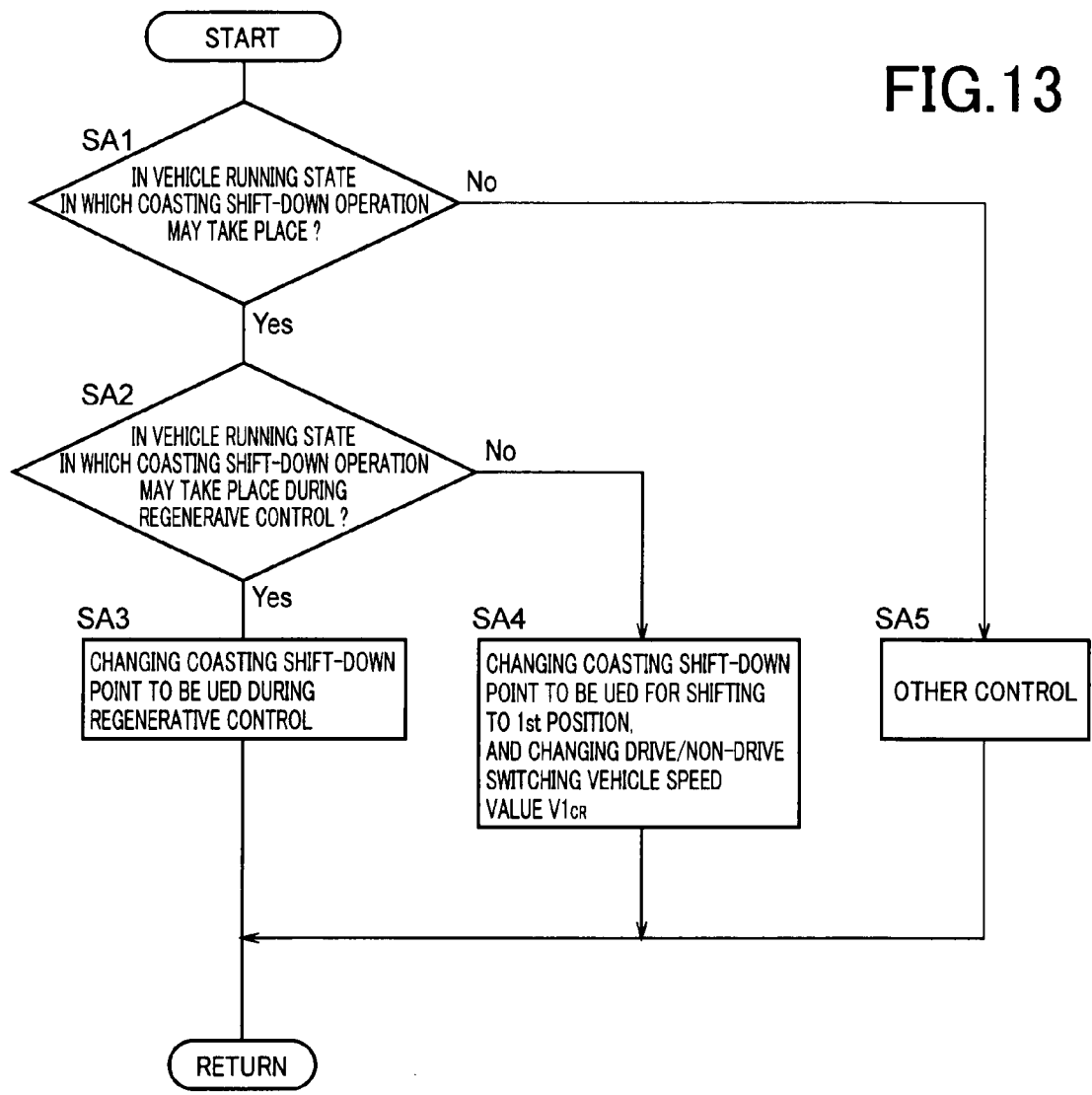
FIG. 13 is a flow chart illustrating a major control operation of the electronic control device of FIG. 4, namely, a control routine for changing a coasting shift-down vehicle speed according to the regenerative power of the second electric motor in the vehicle coasting state.

FIG. 13 is the flow chart illustrating a major control operation of the electronic control device 80, namely, a control routine for changing the coasting shift-down vehicle speed value $V_{CD}$ according to the second electric motor regenerative power $P_{M2R}$ in the vehicle coasting state. This control routine is repeatedly executed with an extremely short cycle time of several milliseconds to several tens of milliseconds for example.

Initially, step SA1 ("step" being hereinafter omitted) is implemented to determine whether the vehicle 6 is presently in a running state in which a coasting shift-down operation of the automatic transmission portion 20 may take place. If an affirmative determination is obtained in SA1, that is, if the vehicle 6 is in the running state in which a coasting shift-down operation of the automatic transmission portion 20 may take place, the control flow goes to SA2. If a negative determination is obtained in SA1, the control flow goes to SA5.

SA2 is provided to determine whether the vehicle 6 is presently in a running state in which the coasting shift-down operation may take place during the above-described regenerative control. In the present embodiment, the coasting shift-down operation from the $4^{th}$ gear position to the $3^{rd}$ gear position and the coasting shift-down operation from the $3^{rd}$ gear position to the $2^{nd}$ gear position may take place during the regenerative control. If an affirmative determination is obtained in SA2, that is, if the coasting shift-down operation may take place during the regenerative control, the control flow goes to SA3. If a negative determination is obtained in SA2, on the other hand, the control flow goes to SA4. It will be understood that SA1 and SA2 correspond to the coasting-state determining means 90.

In SA3 corresponding to the costing shift-down point changing means 92, the shifting points $PT_{43}$ and $PT_{32}$ for the coasting shift-down operations during the regenerative control are set or changed according to the second electric motor regenerative power $P_{M2R}$. Described in detail, the coasting shift-down points $PT_{43}$ and $PT_{32}$ are set such that the coasting shift-down operations take place when the second electric motor regenerative torque $T_{M2R}$ is equal to or larger than the predetermined torque value $T1_{M2R}$. For instance, the shifting point $PT_{43}$ for the coasting shift-down operation from the $4^{th}$ gear position to the $3^{rd}$ gear position is set so as to follow the coasting shift-down line (broken line) L05 indicated in FIG. 12, while the shifting point $PT_{32}$ for the coasting shift-down operation from the $3^{rd}$ gear position to the $2^{nd}$ gear position is set so as to follow the coasting shift-down line (broken line) L06 also indicated in FIG. 12. On the basis of the coasting shift-down points $PT_{43}$ and $PT_{32}$, the determination as to whether the above-described coasting shift-down operations should be performed is made. The second electric motor regenerative power $P_{M2R}$ is calculated on the basis of the controlled electric current and operating speed $N_{M2}$ of the second electric motor M2, for example.

In SA4, the shifting point $PT_{21}$ for the coasting shift-down operation from the $2^{nd}$ gear position to the $1^{st}$ gear position is set or changed according to the second electric motor regenerative power $P_{M2R}$. Described in detail, the shifting point $PT_{21}$ for the coasting shift-down operation from the $2^{nd}$ gear position to the Pt gear position of the automatic transmission 20 is set such that the shifting point $PT_{21}$ decreases with an increase of the second electric motor regenerative power $P_{M2R}$. For instance, the above-described coasting shift-down point $PT_{21}$ is set so as to follow the coasting shift-down line (broken line) L01 indicated in FIG. 9. On the basis of the coasting shift-down point $PT_{21}$, the determination as to whether the above-described coasting shift-down operation should be performed is made. In SA4 in which the above-described coasting shift-down point $PT_{21}$ is set, the above-described drive/driven switching vehicle speed value $V1_{CD}$ is also set such that the vehicle speed value $V1_{CR}$ decreases with an increase of the second electric motor regenerative power $P_{M2R}$. It will be understood that SA4 corresponds to the hybrid control means (creep running control means) 86 and the coasting shift-down point changing means 92.

In SA5, the other controls such as the shifting control in the on state of the accelerator pedal are implemented.

The present embodiment has the following advantages (A1) through (A9):

(A1) According to the present embodiment, the hybrid control means 86 implements the above-described regenerative control to control the second electric motor M2 to perform the regenerative operation in the vehicle coasting state, and step-variable shifting control means 82 controls the automatic transmission portion 20 to perform a shift-down operation at the above-described coasting shift-down vehicle speed value $V_{CD}$ in the vehicle coasting state. Further, the coasting shift-down point changing means 92 changes the above-described coasting shift-down vehicle speed value $V_{CD}$ according to the second electric motor regenerative power $P_{M2R}$ in the vehicle coasting state. Thus, the coasting shift-down vehicle speed value $V_{CD}$ can be set according to a parameter in the form of the second electric motor regenerative power $P_{M2R}$, so as to maximize an amount of regeneration of an electric energy, so that the coasting shift-down operation of the automatic transmission portion 20 can be performed at the thus set vehicle speed value $V_{CD}$ so as to improve the fuel economy, as compared with a coasting shift-down operation performed at the fixed vehicle speed value $V_{CD}$.

(A2) The present embodiment is further configured such that the hybrid control means 86 controls the second electric motor M2 in the vehicle coasting state, so as to function as the electric generator to perform the regenerative operation at a vehicle speed higher than the above-described drive/driven switching vehicle speed value $V1_{CR}$, and so as to function as the vehicle drive motor to generate the vehicle drive torque at a vehicle speed lower than the drive/driven switching vehicle speed value $V1_{CR}$. The present embodiment is further configured to lower the above-described coasting shift-down vehicle speed value $V1_{CD}$ at which the coasting shift-down operation to the first gear position is performed, and the above-described drive/driven switching vehicle speed value $V1_{CR}$, with an increase of the second electric motor regenerative power $P_{M2R}$, as indicated in FIG. 9. Accordingly, the vehicle can be run in a creeping mode at the vehicle speed not higher than the drive/driven switching vehicle speed value $V1_{CR}$, and the second electric motor M2 can perform the regenerative operation at the vehicle speed within a range the lower limit of which is as low as the drive/driven switching vehicle speed which is lowered according to the second electric motor regenerative power $P_{M2R}$, so that the shift-down operation to the first gear position (lowest shift position) can be performed in the vehicle coasting state, so as to improve the fuel economy. If only the above-described drive/driven switching vehicle speed value $V1_{CR}$ was lowered, while the above-described coasting shift-down vehicle speed value $V1_{CD}$ is unchanged, the vehicle deceleration might be interrupted in the coasting shift-down operation performed in the above-described driven vehicle speed region, in the above-described clutch-free state as indicated in FIG. 8. In the present embodiment wherein both of the above-described coasting shift-down vehicle speed value $V1_{CD}$ and the above-described drive/driven switching vehicle speed value $V1_{CR}$ are similarly changed, the interruption of the vehicle deceleration in the coasting shift-down operation to the first gear position can be prevented. In this respect, it is noted that the interruption of the vehicle deceleration in the driven vehicle speed region in the coasting shift-down operation performed in the clutch-free state as indicated in FIG. 8 can be prevented where the vehicle 6 is provided with an electronically controlled brake system (abbreviated as "ECB"), but an operation of the ECB to prevent the above-described interruption of the vehicle deceleration may deteriorate the fuel economy.

(A3) The present embodiment is further configured such that the step-variable shifting control means 82 controls the automatic transmission portion 20 to perform the coasting shift-down operation from the $2^{nd}$ gear position to the $1^{st}$ gear position, by engaging one of the coupling elements of the automatic transmission portion 20 selected to be engaged, after the AT input speed $N_{ATIN}$ is controlled by the second electric motor M2 under the control of the hybrid control means 86, to the $1^{st}$ position synchronous speed value to be established after the coasting shift-down operation, while another of the coupling elements selected to be released and the above-described one coupling element selected to be engaged are placed in released states thereof, that is, in the above-described clutch-free state, as indicated in the time chart of FIG. 8. Accordingly, the shifting shock upon the coasting shift-down operation from the $2^{nd}$ gear position to the $1^{st}$ gear position can be reduced to improve the drivability of the vehicle, although the $2^{nd}$ and $1^{st}$ gear positions have a large stepping gear ratio.

(A4) As is apparent from the iso-power curves L02 and L02' in FIG. 10, the amount of reduction of the loss of the second electric motor M2 by the shift-down operation of the automatic transmission portion 20 that causes a rise of the second electric motor M2 is small when the shift-down operation is performed while the torque of the second electric motor M2 is relatively small. In the present embodiment, however, the coasting shift-down point changing means 92 sets the coasting shift-down points $PT_{43}$ and $PT_{32}$ such that the corresponding coasting shift-down operations of the automatic transmission portion 20 are performed under the condition that the second electric motor regenerative torque $T_{M2R}$ generated during the regenerative operation of the second electric motor M2 to be performed under the control of the hybrid control means 86 after the shift-down operations in the coasting state of the vehicle (after the coasting shift-down operations) is equal to or larger than the predetermined torque value $T1_{M2R}$. Accordingly, although the coasting shift-down operations cause a subsequent increase of the above-described transmission loss (indicated in FIG. 11), the amount of reduction of the above-described MG2 loss (also indicated in FIG. 11) by the shift-down operations is larger than the amount of increase of the transmission loss, so that the regeneration efficiency of the vehicle 6 as a whole is improved, making it possible to improve the fuel economy.

(A5) The present embodiment is further configured such that the vehicular power transmitting system 10 is provided with the differential portion 11 having the power distributing mechanism 16 connected between the engine 8 and the automatic transmission portion 20, and the first electric motor M1 which is operatively connected to the power distributing mechanism 16 and the operating state of which is controlled to control the differential state of the power distributing mechanism 16. Accordingly, although the automatic transmission portion 20 is a step-variable transmission the speed ratio $\gamma_{AT}$ of which is variable in steps, the vehicular power transmitting system 10 as a whole is operable as a continuously-variable transmission in which the total speed ratio $\gamma_T$ is varied continuously, when the differential state of the power distributing mechanism 16 is controlled.

(A6) The present embodiment is further configured such that the power distributing mechanism 16 is principally constituted by the differential-portion planetary gear set 24 having the first rotary element RE1 (differential-portion carrier CA0), second rotary element RE2 (differential-portion sun gear S0) and third rotary element RE3 (differential-portion ring gear R0). The first rotary element RE1 is connected to the engine 8, and the second rotary element RE2 is connected to the first electric motor M1, while the third rotary element RE3 is connected to the second electric motor M2 and the input rotary member (power transmitting member 18) of the automatic transmission portion 20. Accordingly, one or both of the engine 8 and the second electric motor M2 can be used as the vehicle drive power source.

(A7) The present embodiment is further configured such that the electric-energy storage device 56 to be charged with the second electric motor regenerative power $P_{M2R}$ is provided, and the first electric motor M1, the second electric motor M2 and the electric-energy storage device 56 are capable of supplying and receiving an electric power to and from each other, so that the above-described second electric motor regenerative power $P_{M2R}$ can be temporarily stored in the electric energy storage device 56 for subsequent use as needed. Further, the first electric motor M1 and second electric motor M2 are capable of electric power transmission to each other through the above-described electric path therebetween.

(A8) The present embodiment is further configured such that the automatic transmission portion 20 has a plurality of shift positions ($1^{st}$ through $4^{th}$ positions) which are mechanically established and which have respective different speed ratios $\gamma_{AT}$, and is shifted from one of the shift positions to another, so that the automatic transmission portion 20 can be made compact in construction and has a relatively wide overall spread of the speed ratios $\gamma_{AT}$.

(A9) The present embodiment is further configured such that the automatic transmission portion 20 has the coupling elements and is shifted by simultaneous releasing and engaging actions of one and another of the coupling elements. Namely, it is possible to improve the fuel economy of the vehicle having an automatic transmission arranged to perform clutch-to-clutch shifting operations.

While the embodiment of this invention has been described in detail by reference to the drawings, it is to be understood that the illustrated embodiments may be combined together, and that the invention may be otherwise embodied.

For example, the coasting shift-down points $PT_{43}$, $PT_{32}$ and $PT_{21}$ represented by the coasting shift-down lines L05 and L06 of FIG. 12 and the coasting shift-down line L01 of FIG. 9 in the illustrated embodiment may be either stored preliminarily in the memory means 84, or calculated as needed in a coasting state of the vehicle.

The unit of the accelerator operation amount $A_{CC}$ used in the illustrated embodiment is not particularly limited. For instance, the unit may be a percentage (%) of the actual operation amount with respect to the maximum operation amount, an angle of operation (degrees or radian) of the accelerator pedal, or an amount of displacement (mm) of a selected portion of the accelerator pedal.

The vehicle speed V used as the variable taken along the horizontal axis of the shifting line map of FIG. 6 used in the illustrated embodiment may be replaced by the output shaft speed $N_{OUT}$ calculated from the vehicle speed V, since the vehicle speed V is proportional to the output shaft speed $N_{OUT}$. This replacement applies to the other shifting line maps (of FIGS. 9 and 12) in the illustrated embodiment.

The illustrated embodiment is preferably configured such that when the regenerative operation of the second electric motor M2 is performed after a coasting shift-down operation as indicated in the time chart of FIG. 7, the hybrid control means 86 controls the second electric motor M2 such that the operating points of the second electric motor M2 before and after the coasting shift-down operation in question follow the same iso-power curve, more particularly, such that the second electric motor regenerative power $P_{M2R}$ after the above-described coasting shift-down operation is held unchanged with respect to that before the coasting shift-down operation, in other words, such that the second electric motor regenerative power $P_{M2R}$ after the above-described coasting shift-down operation approaches that before the coasting shift-down operation.

In the illustrated embodiment, the above-described synchronization control is implemented in the above-described clutch-free state during the coasting shift-down operation from the $2^{nd}$ gear position to the $1^{st}$ gear position as indicated in FIG. 8. However, the coasting shift-down operation from the $2^{nd}$ gear position to the $1^{st}$ gear position may be performed without the synchronization control in the clutch-free state, like the coasting shift-down operation indicated in FIG. 7.

Although all of the coasting shift-down points $PT_{43}$, $PT_{32}$ and $PT_{21}$ are set or changed according to the second electric motor regenerative power $P_{M2R}$ in the illustrated embodiment, one or two of those coasting shift-down points $PT_{43}$, $PT_{32}$ and $PT_{21}$ may be set or changed.

While the coasting shift-down lines in the illustrated embodiment are defined in the shifting line map shown in FIGS. 9 and 12 wherein the vehicle speed V and the vehicle drive power are used as the variables (parameters), the parameters to be used in the shifting line map are not particularly limited. For example, the coasting shift-down lines may be defined in a shifting line map using the vehicle speed V and the second electric motor torque $T_{M2R}$ as the variables (parameters), unlike the coasting shift-down lines of FIGS. 9 and 12.

In the illustrated embodiment, the vehicle 6 is provided with the differential mechanism in the form of the power distributing mechanism 16, and the first electric motor M1. However, the vehicle 6 may be a so-called "parallel hybrid vehicle" which is not provided with the first electric motor M1 and the power distributing mechanism 16 and in which the engine 8, a clutch, second electric motor M2, automatic transmission portion 20 and drive wheels 34 are connected in series with each other, for example. The clutch indicated above may be disposed as needed, between the engine 8 and the second electric motor M2, and the above-described parallel hybrid vehicle may not be provided with the clutch.

While the vehicle 6 in the illustrated embodiment is a hybrid vehicle, the vehicle 6 may be replaced by an ordinary engine vehicle not provided with the power distributing mechanism 16 and the electric motors M1 and M2, or an electric vehicle not provided with the engine 8, power distributing mechanism 16 and first electric motor M1 and provided with the second electric motor M2 as a vehicle drive power source.

Although the automatic transmission portion 20 in the illustrated embodiment is an automatic transmission configured to perform clutch-to-clutch shifting operations, the automatic transmission portion 20 may be replaced by an automatic transmission of any other type, such as an automatic transmission including actuators to automatically shift a transmission commonly used as a manual transmission having a plurality of mutually meshing gear pairs with respective different gear ratios which are disposed on mutually parallel rotary shafts and one of which is selectively placed in a power transmitting state.

In the illustrated embodiment, the second electric motor M2 is connected directly to the power transmitting member 18. However, the second electric motor M2 need not be connected to the power transmitting member 18, and may be connected to the power transmitting path between the power transmitting member 18 and the drive wheels 34 directly or indirectly through a transmission, a planetary gear set or a coupling device.

Although the differential portion 11 in the illustrated embodiment functions as an electrically controlled continuously variable transmission the speed ratio $\gamma 0$ of which is continuously variable from the minimum value $\gamma 0_{min}$ to the maximum value $\gamma 0_{max}$, with the operating state of the first electric motor M1 being controlled, the differential portion 11 may be modified such that its speed ratio $\gamma 0$ is not variable continuously, but is variable in steps by utilizing its differential function.

In the power distributing mechanism 16 in the illustrated embodiments, the differential-portion carrier CA0 is fixed to the engine 8, and the differential-portion sun gear S0 is fixed to the first electric motor M1 while the differential-portion ring gear R0 is fixed to the power transmitting member 18. However, this arrangement is not essential. The engine 8, first electric motor M1 and power transmitting member 18 may be fixed to any other elements selected from the three elements CA0, S0 and R0 of the differential-portion planetary gear set 24.

While the engine 8 is connected directly to the input shaft 14 in the illustrated embodiment, the engine 8 may be operatively connected to the input shaft 14 through gears or a belt, for instance, and need not be disposed coaxially with the input shaft 14.

In the illustrated embodiment, the first electric motor M1 and the second electric motor M2 are disposed coaxially with the input shaft 14, and the first electric motor M1 is connected to the differential-portion sun gear S0 while the second electric motor M2 is connected to the power transmitting member 18. However, this arrangement is not essential, and the first and second electric motors M1, M2 may be operatively connected to the differential-portion sun gear S0 and the power transmitting member 18, respectively, through gears, belts or speed reduction devices, for instance.

The hydraulically operated frictional coupling devices such as the first and second clutches C1, C2 used in the illustrated embodiment may be replaced by magnetic-power type, electromagnetic type or mechanical type coupling devices such as powder (magnetic powder) clutches, electromagnetic clutches or meshing type dog clutches. Where the electromagnetic clutches are used, the hydraulic control unit 70 includes an electric or electromagnetic switching device for controlling a signal circuit for generating electric commands to be applied to the electromagnetic clutches instead of the hydraulic circuit switching valves.

While the engine 8 and the differential portion 11 are connected directly to each other in the power transmitting system 10 in the illustrated embodiment, the engine 8 and the differential portion 11 need not be connected directly each other, and a clutch may be disposed between the engine 8 and the differential portion 11.

In the illustrated embodiment, the differential portion 11 and the automatic transmission portion 20 are connected in series to each other. However, this arrangement is not essential. For example, the power transmitting system 10 may be arranged such that the differential portion 11 and the automatic transmission portion 20 are not mechanically independent of each other, provided the power transmitting system 10 as a whole has an electric differential function, and a function to perform a shifting operation according to a principle different from that of a shifting operation by the electric differential function. Further, the positions and order of arrangement of the differential portion 11 and automatic transmission portion 20 are not particularly limited, provided the automatic transmission portion 20 is disposed so as to constitute a part of the power transmitting path between the engine 8 and the drive wheels 34.

The power distributing mechanism 16 in the illustrated embodiment is constituted by one planetary gear set (differential-portion planetary gear set 24), the power distributing mechanism may be constituted by two or more planetary gear sets, so that the power distributing mechanism functions as a transmission having three or more speed ratios in its non-differential state (fixed-speed-ratio shifting state). Further, the differential-portion planetary gear set 24 need not be a single-pinion type, and may be a double-pinion type. In the case where the power distributing mechanism 16 is constituted by two or more planetary gear sets, as described above, too, the rotary elements of these planetary gear sets may be operatively connected to the engine 8, first and second electric motors M1, M2, and power transmitting member 18, and to output shaft 22 where appropriate, and the clutches C and brakes B connected to the rotary elements may suitably controlled to switch the shifting state between its step-variable shifting state and its continuously-variable shifting state.

In the power transmitting system 10 in the illustrated embodiment, the first electric motor M1 and the second rotary element RE2 are connected directly to each other, while the second electric motor M2 and the third rotary element RE3 are connected directly to each other. However, the first electric motor M1 may be connected to the second rotary element RE2 through a clutch or any other coupling element, while the second electric motor M2 may be connected to the third rotary element RE3 through a clutch or any other coupling element.

In the illustrated embodiment, the second electric motor M2 is connected to the power transmitting member 18 which constitutes a part of the power transmitting path between the engine 8 and the drive wheels 34. However, the power transmitting system 10 can be composed such that the second electric motor M2 which is connected to the above-indicated power transmitting path may be connectable to the power distributing mechanism 16 through a clutch or any other coupling device, so that the differential state of the power distributing mechanism 16 can be controlled by controlling the operating state of the second electric motor M2 rather than the first electric motor M1.

In the illustrated embodiment, the differential portion 11 is provided with the first and second electric motors M1, M2. However, the first and second electric motors M1, M2 may be provided in the power transmitting system 10, such that the motors M1, M2 are disposed outside or separately from the differential portion 11.

It is to be understood that the embodiments have been described for illustrative purpose only, and that the present invention may be embodied with various other changes and improvements which may occur to those skilled in the art.

NOMENCLATURE OF ELEMENTS

6: Vehicle
8: Engine
10: Power transmitting system (Vehicular power transmitting system)
11: Differential portion (Electric differential portion)
16: Power distributing mechanism (Differential mechanism)
18: Power transmitting member (Input-side rotary member of Automatic transmission)
20: Automatic transmission portion (Automatic transmission)
24: Differential portion planetary gear set (Planetary gear set)
34: Drive wheels
56: Electric-energy storage
80: Electronic device control device (Shifting control apparatus)
M1: First electric motor (Differential electric motor)
M2: Second electric motor (Vehicle drive electric motor)
C1: First clutch (Coupling element)
C2: Second clutch (Coupling element)
C3: Third clutch (Coupling element)
B1: First brake (Coupling element)
B2: Second brake (Coupling element)
RE1: First rotary element
RE2: Second rotary element
RE3: Third rotary element

The invention claimed is:

1. A shifting control apparatus for a power transmitting system of a vehicle provided with a vehicle drive electric motor, and a step-variable automatic transmission constituting a part of a power transmitting path between said vehicle drive electric motor and drive wheels, the shifting control apparatus controls said vehicle drive electric motor to perform a regenerative operation in a coasting state of the vehicle, and controls said automatic transmission to perform a shift-down operation at a predetermined coasting shift-down vehicle speed in the coasting state, the shifting control apparatus being configured:
to change said coasting shift-down vehicle speed according to a regenerative power of said vehicle drive electric motor;
to control said vehicle drive electric motor in the coasting state of the vehicle, so as to perform the regenerative operation at a vehicle speed higher than a predetermined drive/driven switching vehicle speed value, and so as to generate a vehicle drive torque at a vehicle speed lower than said predetermined drive/driven switching vehicle speed value; and
to lower said coasting shift-down vehicle speed value at which the shift-down operation of said automatic transmission to a lowest shift position thereof is performed, and said drive/driven switching vehicle speed value, with an increase of said regenerative power of said vehicle drive electric motor.

2. The shifting control apparatus according to claim 1, configured to control said automatic transmission to perform the shift-down operation to said lowest shift position in the coasting state of the vehicle, by engaging one of coupling elements of the automatic transmission selected to be engaged, after a rotating speed of an input speed of said automatic transmission is controlled by said vehicle drive electric motor to a synchronous speed value to be established after said shift-down operation, while the coupling element selected to be released and said coupling element selected to be engaged are placed in released states thereof.

3. The shifting control apparatus according to claim 1, configured to perform said shift-down operation in the coasting state of the vehicle under a condition that a regenerative torque generated during the regenerative operation of said vehicle drive motor to be performed after said shift-down operation is equal to or larger than a predetermined torque value.

4. The shifting control apparatus according to claim 1, wherein the power transmitting system is further provided with an electric differential portion having a differential mechanism connected between an engine and said automatic transmission, and a differential electric motor being operatively connected to said differential mechanism and a differential state of the differential mechanism is controlled by controlling an operating state of the differential electric motor.

5. The shifting control apparatus according to claim 4, wherein said differential mechanism is a planetary gear set having a first rotary element, a second rotary element and a third rotary element, said first rotary element being connected to said engine, said second rotary element being connected to said differential electric motor, and said third rotary element being connected to said vehicle drive electric motor and an input rotary member of said automatic transmission.

6. The shifting control apparatus according to claim 4, wherein the power transmitting system is further provided with an electric-energy storage device to be charged with said regenerative power of said vehicle drive electric motor, and said vehicle drive electric motor, said differential electric motor and said electric-energy storage device being capable of supplying and receiving an electric power to and from each other.

7. The shifting control apparatus according to claim 1, wherein said automatic transmission has a plurality of shift positions which are mechanically established and which have respective different speed ratios, and is shifted from one of the shift positions to another.

8. The shifting control apparatus according to claim 7, wherein said automatic transmission has coupling elements and is shifted by simultaneous releasing and engaging actions of one and another of the coupling elements.

* * * * *